US011553022B2

(12) United States Patent
Ragot et al.

(10) Patent No.: US 11,553,022 B2
(45) Date of Patent: Jan. 10, 2023

(54) SIGNALING OF A REQUEST TO ADAPT A VOICE-OVER-IP COMMUNICATION SESSION

(71) Applicant: ORANGE, Issy-les-Moulineaux (FR)

(72) Inventors: Stephane Ragot, Chatillon (FR); Jerome Dufour, Chatillon (FR); Najmeddine Majed, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/652,606

(22) PCT Filed: Sep. 14, 2018

(86) PCT No.: PCT/FR2018/052256
§ 371 (c)(1),
(2) Date: Mar. 31, 2020

(87) PCT Pub. No.: WO2019/068982
PCT Pub. Date: Apr. 11, 2019

(65) Prior Publication Data
US 2020/0236154 A1    Jul. 23, 2020

(30) Foreign Application Priority Data
Oct. 2, 2017   (FR) ...................... 1759203

(51) Int. Cl.
*H04L 65/65*      (2022.01)
*H04L 65/80*      (2022.01)
(Continued)

(52) U.S. Cl.
CPC .......... *H04L 65/65* (2022.05); *H04L 65/1104* (2022.05); *H04L 65/70* (2022.05); *H04L 65/80* (2013.01)

(58) Field of Classification Search
CPC . H04L 65/608; H04L 65/1006; H04L 65/607; H04L 65/80; H04L 1/0006; H04L 1/0014; H04L 1/0023
See application file for complete search history.

(56) References Cited

U.S. PATENT DOCUMENTS

2007/0183323 A1* 8/2007 Hannu .................... H04L 47/10
                                                                370/235
2010/0017509 A1* 1/2010 Frankkila .............. H04M 7/006
                                                                709/224
(Continued)

FOREIGN PATENT DOCUMENTS

CN             101667888 A   *   3/2010    ............ H04W 28/22

OTHER PUBLICATIONS

International Search Report dated Oct. 30, 2018 for corresponding International Application No. PCT/FR2018/052256, filed Sep. 14, 2018.

(Continued)

*Primary Examiner* — Oanh Duong
(74) *Attorney, Agent, or Firm* — David D. Brush; Westman, Champlin & Koehler, P.A.

(57) ABSTRACT

A method, receiver device and terminal for signaling an adaptation request to adapt a coding/decoding of real-time signals of a real-time communication session, from a receiver device to a sender device. The method is such that the adaptation request relates to a demand for aggregation and/or redundancy of frames, that it is generated according to the existence of a signaling parameter arising from a phase of negotiation of codecs used during initialization of the communication session and in that it is transported via a real-time protocol of RTP type.

6 Claims, 12 Drawing Sheets

(51) Int. Cl.
H04L 65/70 (2022.01)
H04L 65/1104 (2022.01)

(56) References Cited

U.S. PATENT DOCUMENTS

| | | | | |
|---|---|---|---|---|
| 2010/0220615 A1* | 9/2010 | Enstrom | ............ | H04L 47/2416 |
| | | | | 370/252 |
| 2010/0232297 A1* | 9/2010 | Johansson | ............ | H04L 1/0009 |
| | | | | 370/241 |
| 2012/0028642 A1* | 2/2012 | Schliwa-Bertling | ........................ | |
| | | | | C12N 5/0686 |
| | | | | 455/436 |
| 2012/0035918 A1* | 2/2012 | Frankkila | ............. | G10L 19/002 |
| | | | | 704/201 |
| 2014/0095670 A1* | 4/2014 | Ozgur | ............... | H04W 36/0083 |
| | | | | 709/219 |
| 2016/0359942 A1* | 12/2016 | Li | ....................... | H04L 65/1069 |
| 2017/0169833 A1* | 6/2017 | Lecomte | ................ | G10L 25/93 |
| 2018/0070404 A1* | 3/2018 | Giguet | ................. | H04W 24/02 |
| 2018/0352092 A1* | 12/2018 | Rajendran | ......... | H04W 36/0094 |
| 2019/0007464 A1* | 1/2019 | Hori | ...................... | H04W 80/10 |
| 2019/0159071 A1* | 5/2019 | Yavuz | ............... | H04W 28/0205 |
| 2020/0045587 A1* | 2/2020 | Choi | ..................... | H04L 65/102 |

OTHER PUBLICATIONS

International Preliminary Report on Patentability and English translation of the International Written Opinion dated Nov. 12, 2018 for corresponding International Application No. PCT/FR2018/052256, filed Sep. 14, 2018.
Rosenberg et al., "SIP: Session Initiation Protocol", RFC 3261, Jun. 2002.
Handley et al., "SDP: Session Description Protocol", RFC 4566, Jul. 2006.
Andreasen, "Session Description Protocol (SDP) Capability Negotiation", RFC 5939, Sep. 2010.
Telecommunication Standardization Sector of ITU, "Series H: Audiovisual and Multimedia Systems Infrastructure of audiovisual services—Systems and terminal equipment for audiovisual services Packet-based multimedia communications systems". Recommendation ITU-T H.323, Dec. 2009.
Telecommunication Standardization Sector of ITU, "Series H: Audiovisual and Multimedia Systems Infrastructure of audiovisual services—Communication procedures Control protocol for multimedia communication", Recommendation ITU-T H.245, May 2011.
Schulzrinne et al., "RTP: A Transport Protocol for Real-Time Applications", RFC 3550, Jul. 2003.
Schulzrinne et al., "RTP Piolile for Audio and Video Conferences with Minimal Control", RFC 3551 Jul. 2003.
Ott et al., "Extended RTP Profile for Real-time Transport Control Protocol (RTCP)-Based Feedback (RTP/AVPF)", RFC 4585, Jul. 2006.
3GPP specification TS 26.114, "3rd Generation Partnership Project; Technical Specification Group Services and System Aspects; IP Multimedia Subsystem (IMS); Multimedia Telephony; Media handling and interaction (Release 15)" Sep. 2017.
Sjoberg et al., "RTP Payload Format and File Storage Format for the Adaptive Multi-Rate (AMR) and Adaptive Multi-Rate Wideband (AMR-WB) Audio Codecs", RFC 4867, Apr. 2007.
3GPP specification TS 26.101, "3rd Generation Partnership Project; Technical Specification Group Services and System Aspects; Mandatory speech codec speech processing functions; Adaptive Multi-Rate (AMR) speech codec frame structure (Release 14)" Mar. 2017.
3GPP specification TS 26.201, "3rd Generation Partnership Project; Technical Specification Group Services and System Aspects; Speech codec speech processing functions; Adaptive Multi-Rate—Wideband (AMR-WB) speech codec; Frame structure (Release 14)" Mar. 2017.
3GPP TS 26.442, "3rd Generation Partnership Project; Technical Specification Group Services and System Aspects; Codec for Enhanced Voice Services (EVS); ANSI C code (fixed-point) (Release 14)", Mar. 2017.
3GPP TS 26.443, "3rd Generation Partnership Project; Technical Specification Group Services and System Aspects; Codec for Enhanced Voice Services (EVS); ANSI C code (floating-point) (Release 14)", Mar. 2017.
3GPP specifications TS 26.441 "3rd Generation Partnership Project; Technical Specification Group Services and System Aspects; Codec for Enhanced Voice Services (EVS); General Overview (Release 14)" Mar. 2017.
3GPP specifications TS 26.445, "3rd Generation Partnership Project; Technical Specification Group Services and System Aspects; Codec for Enhanced Voice Services (EVS); Detailed Algorithmic Description Release 14)" Mar. 2017.
Singer et al., "A General Mechanism for RTP Header Extensions", RFC 5285, Jul. 2008.
Technical Specification "3rd Generation Partnership Project; Technical Specification Group Services and System Aspects; IP Multimedia Subsystem (IMS); Multimedia Telephony; Media handling and interaction (Release 7)", 3rd Generation Partnership Project (3GPP TS 26.114), V7.16.0 (Mar. 2012).
Qualcomm Incorporated: "eVoLP: MTSI Adaptation and Capabilities Parameters", 3GPP Draft; S4-170627 EVOLP MTSI Adaptation and Capabilities Parameters 3rd Generation Partnership Project (3GPP), Mobile Competence Centre; 650, Route Des Lucioles; F-06921 Sophia-Antipolis Cedex, vol. SA WG4, No. Sophia Antipolis, France; Jun. 26, 2017-Jun. 30, 2017 Jun. 22, 2017 (Jun. 22, 2017), XP051303879.

* cited by examiner

| Index | AMR | AMR-WB |
|---|---|---|
| 0 | AMR 4.75 | AMR-WB 6.60 |
| 1 | AMR 5.15 | AMR-WB 8.85 |
| 2 | AMR 5.9 | AMR-WB 12.65 |
| 3 | AMR 6.7 | AMR-WB 14.25 |
| 4 | AMR 7.4 | AMR-WB 15.85 |
| 5 | AMR 7.95 | AMR-WB 18.25 |
| 6 | AMR 10.2 | AMR-WB 19.85 |
| 7 | AMR 12.2 | AMR-WB 23.05 |
| 8 | | AMR-WB 23.85 |

FIG 3c (Prior art)

| PH | ToC | SD |
|---|---|---|

FIG 3a

| 0 | 1 | 2 | 3 |
|---|---|---|---|
| | | CMR | |

FIG 3b

| 0 | 1 | 2 | 3 | 4 | 5 |
|---|---|---|---|---|---|
| F | | Frame Type | | | Q |

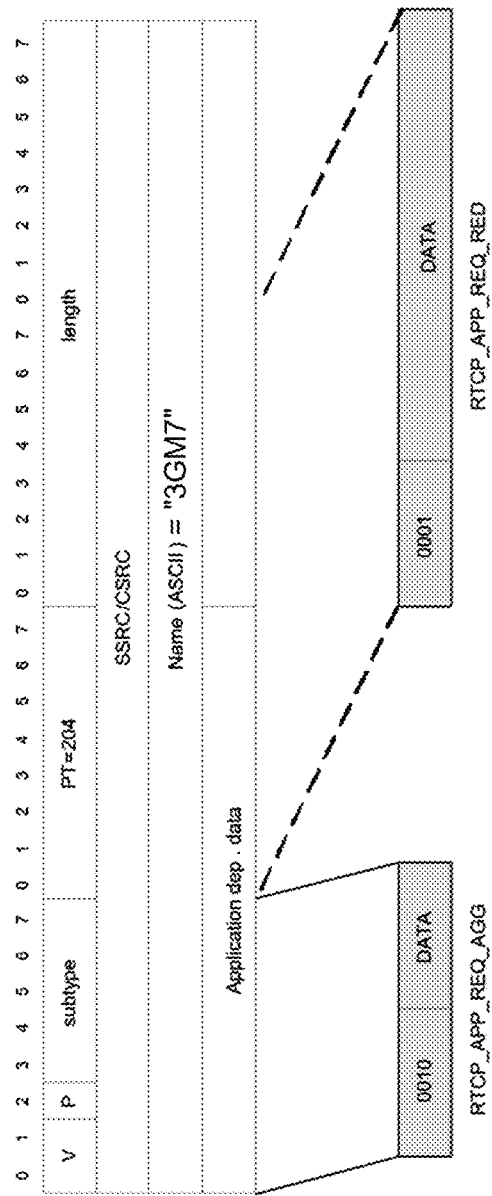
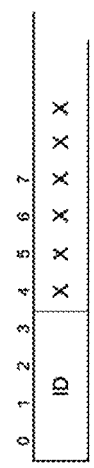
FIG 5a
FIG 5b (Prior art)

SIGNALING OF A REQUEST TO ADAPT A VOICE-OVER-IP COMMUNICATION SESSION

CROSS-REFERENCE TO RELATED APPLICATIONS

This application is a Section 371 National Stage Application of International Application No. PCT/FR2018/052256, filed Sep. 14, 2018, the content of which is incorporated herein by reference in its entirety, and published as WO 2019/068982 on Apr. 11, 2019, not in English.

FIELD OF THE DISCLOSURE

The present invention relates to the field of telecommunications and more particularly of packet communication networks. In this type of network, it is possible to convey data streams associated with real-time services.

The Internet protocol (IP) developed by the IETF (for Internet Engineering Task Force) is implemented in packet communication networks both to support non real-time services such as data transfer services, website-browsing services and electronic-messaging services, and real-time or conversational services, such as telephony over IP, video telephony over IP or even video streaming over IP.

The invention more particularly relates to a signaling of an adaptation request that requests adaptation of the coding/decoding of real-time signals such as voice or video signals during a real-time communication session between two communication terminals.

BACKGROUND OF THE DISCLOSURE

An example of an existing voice-over-IP communication system is described with reference to FIG. 1. This figure illustrates a bidirectional voice-over-IP (VoIP) communication system with two telephony terminals (100 and 150) connected by an IP packet network (125). The "signaling plane" is not shown in this figure; however possible solutions for setting up and managing calls may be based on various known protocols such as:
- SIP/SDP (for Session Initiation Protocol/Session Description Protocol) according to IETF specifications RFC 3261 and RFC 4566, as in multimedia services over IMS (for IP Multimedia SubSystem). In order to facilitate signaling exchanges on media capacities and the associated offers/answers, it is also possible to use "SDPcapneg" according to IETF specification RFC 5939.
- JSEP (for JavaScript Session Establishment Protocol) which uses SDP syntax to define WebRTC session descriptions (with an exchange via WebSocket or another means).
- H.323/H.245.

FIG. 1 is a simplified view of the "media plane" and of the audio chain used when the call is set up. Here, only the case of a mono audio signal is considered, the ambient acoustic signal for example being captured by a microphone (101 and 151) at each end of the communication. It will be noted that the case of a mono input/output signal may easily be generalized to a multichannel case.

The remote signal is rendered via a loudspeaker (102 and 152). The captured and rendered audio signals in general undergo various acoustic processing operations when sent and when received (103 and 153) such as for example:
- analog/digital conversion, gain control, noise reduction, echo cancellation, etc., when sent
- digital/analog conversion, gain control, etc., when received.

When sent, the preprocessed audio signal is coded into successive frames—typically with an (in general fixed) frame length ranging from 10 to 60 ms—and the coded frames are formed into IP packets (104 and 154).

The packets are typically transported using the RTP protocol (RTP standing for Real Time Protocol), which is described in IETF specification RFC 3550, this protocol being located above the IP/UDP (for User Datagram Protocol) transport protocols. It will be noted that the UDP protocol may be replaced by another transport protocol, for example by TCP (for Transmission Control Protocol) in order in particular to facilitate passage through networks with NAT (for Network Address Translation), proxies or firewalls.

When received (105 and 155), the packets are delivered to a jitter buffer that aims to compensate for variations in the reception times, and the signal is decoded (while compensating for any loss of frames) and lastly the reconstructed signal is post-processed (103 and 153) and rendered.

The communication is here assumed to be bidirectional and the communication system thus forms a closed-loop system with feedback. The feedback may be transported in two ways:
"Out of band" (i.e. contained in packets that form an additional stream with respect to the RTP media stream). Typically, the RTCP protocol (RTCP standing for Real-Time Control Protocol) is used as feedback channel. RTCP allows control packets to be transmitted in packets separate from the RTP stream. It will be recalled that RTCP packets may be of substantial size and therefore result in a non-negligible additional bit rate; in addition, the possible loss of packets may be problematic, because if RTCP is used for adaptation purposes the transported request may be lost. The transmission of packets using RTCP protocol may be discontinuous and non-repetitive, this possibly making the adaptation less reactive and dependent on the network conditions (packet losses, etc.).
"In band" (i.e. in the RTP media stream). This type of feedback may be considered more robust than RTCP because it is possible to repeat a given request in a plurality of successive packets (typically every 20 ms for codecs such as AMR, AMR-WB or EVS, which are considered below). It will be noted that in certain situations (call waiting, listening to voicemail, etc.), it is possible for the RTP packets to be sent in a single direction, however it is here assumed that the transmission of RTP packets is bidirectional for the feedback to work.

It will be recalled that there are various RTP-protocol profiles the main ones of which are AVP (for Audio Video Profile) according to specification RFC 3551 and AVPF (for Audio Video Profile with Feedback) according to specification RFC 4585. Without loss of generality, the secure versions thereof (SAVP and SAVPF where the prefix "S" means "Secure") are not reviewed here because these security aspects are beyond the scope of the invention. A major difference between AVP and AVPF is the time constraints on the transmission of RTCP packets: with AVP it is possible to send an RTCP packet on average only every 5 seconds, this in general being insufficient to achieve a reactive adaptation in case of very variable network conditions. In addition, with the AVFP protocol it is possible to use RTCP FB (FB for FeedBack) messages whereas only RTCP APP (APP for "Application defined") packets are defined in AVP for transporting feedback outside of the RTCP reports (SR and RR).

In general, a plurality of types of degradation may potentially affect the quality of voice over IP:

variable bandwidth/congestion of the network
losses, de-sequencing, repetition of packets
delay, variation in packet transmission delay
clock drift between the terminals There are various solutions for mitigating these various types of degradation, including terminal adaptation solutions. Two types of adaptation may be distinguished between in VoIP terminals: sender-based adaptation and receiver-based adaptation.

For the sender to be able to adapt and decide on its adaptation ("sender-based" adaptation), said sender must receive feedback from the remote receiver indicating, for example, the observed loss rate or the available bandwidth as estimated by the remote receiver.

In a "receiver-based" adaptation, the feedback received by the local sender (104) is an adaptation decision (for example the choice of the mode or rate to be used) made by the remote receiver (155)—this feedback is transmitted first to the remote sender (154) then to the local receiver (105).

In FIG. 1, this feedback is indicated by dashed arrows pointing in the direction from the receiver 155 to the sender 104. Of course, this feedback may be given in the other direction of the communication, with feedback, from the receiver 105 to the sender 154, transmitted via the blocks 104 and 155; this inverse direction is not shown in FIG. 1 in order not to clutter this figure.

In one example of adaptation solutions, to control variation in bandwidth or congestion of the network, it is possible to implement the techniques described below.

When a codec operates at a fixed rate, one adaptation solution for modifying the actual data rate over the network consists in varying the number of consecutive signal frames in a packet (frame bundling) and thus varying the packet rate and the relative rate of IP/UDP/RTP protocol headers (and of protocol headers of lower layers). When the call negotiation uses the SDP protocol, the ability to use this adaptation of the packet rate depends on the parameters "ptime" and "maxptime", which respectively define the minimum and maximum possible lengths of a frame. For example, for ptime=20 and time maxptime=240, a packet represents 20 ms of signal and it is possible to multiplex up to 12 frames per packet.

FIGS. 2a to 2d illustrate examples of IP packet formats in which one or more frames are sent per packet. The default packet generation mode is considered to correspond to the case of FIG. 2a in which the current frame N is placed in packet P, i.e. in which it is possible to consider that P=N. An example of frame bundling is given in FIG. 2b, in which frames N and N−1 are placed in packet P—the packet rate is therefore two times lower than the frame rate and it is possible to consider that P=⌊N/2⌋ (⌊•⌋ represents rounding to the integer below).

When a codec is multi-rate, it is also possible to change the rate of the codec. This change in rate may be carried out depending on the available bandwidth as estimated by the remote receiver and received by feedback ("sender-based" decision) or depending on a rate change request received by feedback ("receiver-based" decision).

It will be noted that there are also solutions other than coding adaptation to avoid congestion—these alternative solutions do not operate at the RTP level or at the application-layer level, but at a lower level. They will not be described here because they are beyond the scope of the invention.

It will lastly be noted that, for non real-time applications using the TCP protocol (TCP standing for Transmission Control Protocol), one conventional approach to adaptation to channel conditions consists in varying the TCP rate using feedback via which the receiver sends a retransmission request (ARQ for Automatic ReQuest) with an indication of the packets not received; the TCP rate is adapted depending on this feedback. The indication of congestion in TCP was originally limited to the indication of losses but it has since been extended to other parameters (analysis of the variation over time in RTT (for Round-Trip Time), etc.).

For a degradation due to packet loss, a minimalist approach to managing this type of degradation is to apply a frame-loss correction in the receiver. This approach is merely reactive and cannot always "hide" very well "holes" (i.e. missing information that is not received) in the decoded signal, in particular when a plurality of consecutive frames are lost or if the codec used is sensitive to losses (a predictive codec for example). It is also necessary to ensure a rapid recovery (return to normal) of the audio signal; the correction for lost frames often produces artefacts that will be more or less audible depending on the type of codec and the loss correction method used. The loss correction may be implemented in the audio decoder or integrated in the receiver into the adaptation operations of the jitter buffer (by "lengthening" the current signal and "stitching" it with the future signal once available and decoded).

A better approach to countering frame losses is to use redundancy, i.e. to repeat entire or partial coded frames (for example, important coded parameters); this approach however has a cost in terms of data rate and delay.

Examples of use of partial redundancy are given for the IETF OPUS ("inbandfec" mode) and 3GPP EVS ("channel-aware mode") codecs, which are known to those skilled in the art. Examples of use of complete redundancy (or "application-layer redundancy") are given in section 10 of the 3GPP specification TS 26.114 (version 15.0.0) for the AMR, AMR-WB and EVS codecs. Below, "application-layer redundancy" will be shortened to "redundancy".

FIGS. 2c and 2d illustrate cases of redundancy in which the coded frame N is repeated in a following packet with a distance, called the "offset", that is denoted K—for K=1, which is shown in FIG. 2c, the packet N contains the frame N and the preceding frame N−1, whereas for K=2, which is shown in FIG. 2d, the packet N contains the frame N and the frame N−2, and an empty frame (NO_DATA). For a larger offset K, the number of empty frames (NO_DATA) "inserted" between the current frame of index N and the redundant frame of index N−K is K−1. It will be noted that it is possible to combine frame redundancy and frame aggregation, this case not being described in detail here (see 3GPP TS 26.114 FIGS. 10.12 and 10.13).

When the call negotiation uses the SDP protocol, the use of this type of application-layer redundancy depends on the "max-red" parameter when the latter is defined in the payload format for a given codec. Typically the "max-red" parameter gives the maximum duration (in ms)—as measured by the sender—between the transmission of a frame (called the primary frame) and the transmission of a redundant version; this parameter therefore allows a maximum delay to be set when redundancy is used. For example "max-red=20" indicates that it is possible to use redundancy and that a redundant frame may be transmitted up to 20 ms after the original frame. In general, when "max-red" is set to 0, this amounts to deactivating use of redundancy and if "max-red" is not present as a signaling parameter (SDP attribute), this indicates that there is no limitation on the use of redundancy—provided that the global passband specified by the SDP parameter "b=AS:" according to IETF RFC 4566 and the coding modes permitted in the session are respected.

For the other types of degradation mentioned, a conventional method used to absorb network jitter, to manage packet repetitions and desequencing, and to re-establish a synchronous stream consists in using a jitter buffer on reception. Static buffers and adaptive buffers are distinguished between. These buffers in general also allow problems with clock drift to be managed. The management of jitter buffers is not reviewed here because it is beyond the scope of the invention.

The 3GPP specification TS 26.114 describes, as seen above, possible coding-adaptation methods. For voice, a plurality of mechanisms for signaling feedback or adaptation requests are described therein:
  use of CMR requests (CMR standing for Codec Mode Request)
  the use of RTCP packets of RTCP APP type (APP standing for APPlication-defined)

FIGS. 3a to 3d illustrate the payload format of the AMR and AMR-WB codecs. The detailed specification of the RTP payload for AMR and AMR-WB may be found in the IETF specification RFC 4867. The mode said to be "bandwidth-efficient" is the only one described here, but it will be recalled that there is another mode that is said to be "octet-aligned". In the octet-aligned mode all the fields of the payload—the header of the payload, the ToC entries, the coded data—are individually aligned (with zero padding if necessary) so that the length (in bits) of these fields is a multiple of 8 (therefore these fields are an integer number of octets in length); in the bandwidth-efficient mode this alignment to an integer number of octets is used only on the complete payload, and therefore this mode may be considered to be more efficient because it requires less zero padding and therefore, of the two formats, it gives the packets of smallest size. However, the octet-aligned mode has more functionalities, such as the ability to sort the coded data by robustness (robust sorting), to use interleaving, or to use a CRC code in the frame to make the transport more robust with respect to frame losses or bit errors.

The payload of a packet for AMR and AMR-WB is illustrated in FIG. 3a: it comprises a PH header (PH standing for Payload Header), a ToC field (ToC standing for Table of Contents) and the SD data (SD standing for Speech Data) coded using AMR or AMR-WB. In the bandwidth-efficient mode, the header is simply a CMR (for Codec Mode Request) field on 4 bits as indicated in FIG. 3b; the definition of the indices in FIG. 3c is that of table 1a of the 3GPP specification TS 26.101, which is entitled "AMR Speech Codec Frame Structure", version 14.0.0, for the AMR codec, and that of table 1a of version 14.0.0 of the 3GPP specification TS 26.201, which is entitled "AMR Wideband Speech Codec; Frame Structure", for the AMR-WB codec.

These indices define different coding modes with different rates for the AMR and AMR-WB codec respectively.

The ToC field consists of a ToC entry list on 6 bits, in which the ith entry represents the ith frame contained in the current packet. Each ToC entry has the format given in FIG. 3d, in which:
  F (1 bit): F=1 indicates that the current frame is followed by another frame in the payload; F=0 indicates that it is the last frame of the packet.
  FT (4 bits): frame-type index, which indicates that the current frame has been coded using a certain AMR or AMR-WB mode or that it is a question of a silence identifier (SID) or of a non-transmitted frame (NO_DATA).
  Q (1 bit): frame-quality index, if Q=0 the frame is damaged.

It is therefore possible to transport a plurality of frames coded in AMR and in AMR-WB and the ToC field allows them to be demultiplexed unambiguously.

It will be noted that it is possible to add bit padding (octets of padding) at the end of the payload. In this case the bit "P" (for Padding) in the RTP header may, optionally, be set to 1 and the additional bits added as specified in RFC 3550; the last octet of this padding contains the number of octets added at the end of the payload (including this last octet).

The 3GPP EVS codec uses multi-mode coding. This EVS codec (EVS standing for Enhanced Voice Services) was standardized at the end of 2014. It is currently defined in two source-code versions:
  source code in fixed-point format (3GPP TS 26.442)
  source code in floating-point format (3GPP TS 26.443)

The input signal of the EVS codec is sampled at a frequency of 8, 16, 32 or 48 kHz and the codec may represent narrowband (NB), wideband (WB), super-wideband (SWP) or fullband (FB) telephonic audio bandwidths. The data rates of the EVS codec are divided into two modes:
  EVS Primary, which comprises
    fixed bit rate coding modes: 7.2, 8, 9.6, 13.2, 16.4, 24.4, 32, 48, 64, 96 and 128 kb/s
    a variable bit rate (VBR) coding mode with an average rate close to 5.9 kbit/s for active speech and that in fact uses a combination of coding modes at 2.8, 7.2 and 8 kbit/s
    a channel-aware mode (CAM) at 13.2 kbit/s in WB and SWB only (which uses a form of partial redundancy to improve robustness to frame losses)
  EVS AMR-WB IO the bit rates of which are identical to the 3GPP AMR-WB codec (9 modes of 6.6 to 23.85 kbit/s)

In addition to the above there is the discontinuous transmission (DTX) mode in which frames detected to be inactive are replaced by SID frames (SID Primary or SID AMR-WB IO) which are transmitted intermittently, on average once every 8 frames. Algorithmic details of the EVS codec are given in the 3GPP specifications TS 26.441 to 26.450 and they are therefore not repeated here.

The payload format for transporting with the RTP protocol data coded using EVS is defined in appendix A of the specification TS 26.445. This format is illustrated in FIGS. 4a to 4g.

There are two different modes for forming the EVS packets:
  The mode by default: the packets are either in compact format or in header-full format, in order to avoid conflicts in size between these two modes priority is given to the compact mode the sizes of which are "protected", whereas the sizes of the header-full mode are penalized by adding zero padding in case of conflict with a size of the compact mode.
  The header-full mode Examples of RTP payloads in compact format are given in FIGS. 4a and 4b for the case of EVS Primary and of EVS AMR-WB IO, respectively; it may in particular be seen that for EVS Primary the payload is merely coded data, there being no payload header and it being impossible to signal an adaptation request (FIG. 4a); for EVS AMR-WB IO, data coded in compact mode are reorganized (certain bits are permutated) and a CMR decreased to 3 bits is defined as header (FIG. 4b). This particular 3-bit CMR case is not described in detail here because there is no free CMR code in this 3-bit signaling space, and therefore it is impossible to make any request other than a 3-bit change of rate.

Examples of RTP payload in header-full format are given in FIGS. 4c and 4d. In the first case (FIG. 4c), a single frame is transported and a ToC header octet (8 bits) is inserted. In the second case (FIG. 4d), two frames are transported in the same packet with 2 ToC headers (2 octets) and a CMR field (1 octet) is also used. In comparison with the payload format of the AMR and AMR-WB codecs, it may therefore be seen that the header-full payload format of the EVS codec also implements CMR and ToC concepts but that these fields are defined using octets (8 bits) and therefore, in the header-full mode, naturally octet aligned, the first bit (MSB) being set to 1 for the CMR and to 0 for the ToC.

A definition of these fields is given in the specification TS 26.445, Appendix A. For the sake of conciseness, all the details of the specification TS 26. 445, Appendix A will not be repeated here.

The 8-bit CMR field is divided into three portions:
H (1 bit): always 1
T (3 bits): bits indicating the type of request in order to distinguish between the various NB, WB, SWB and FB Primary EVS modes (which include the VBR and CAM modes) and EVS AMR-WB IO mode.
D (4 bits): CMR request The possible values of the CMR field are defined in the specification TS 26.445, Appendix A and define the various modes of the codec. They are recalled in FIG. 4g. Certain codes are not used.

Similarly, the 8-bit ToC field is divided into 3 portions:
H (1 bit): always 0
F (1 bit): If F=1, another frame follows the current frame, if F=0, it is a question of the last frame of the packet.
FT (6 bits): bits indicating the frame type, i.e. EVS Primary or EVS AMR-WB IO (including the SID mode). This field is itself divided into 3 portions: EVS mode (1 bit), Unused/Q bit (1 bit) depending on the EVS-mode bit, and EVS rate (4 bits).

It will be noted that for EVS it is also possible to add bit padding (octets of padding) at the end of the payload. In this case the bit "P" (for Padding) in the RTP header may—optionally—be set to 1 and the additional bits added as specified in RFC 3550; the last octet of this padding contains the number of octets added to the end of the payload (including this last octet).

The use of RTCP APP for voice over IMS is detailed in section 10 of the 3GPP specification TS 26.114. The format of an RTCP APP packet is illustrated in FIG. 5a. The meaning of the fields of the RTCP header (V, P, PT, length, SSRC/CSRC) is not reviewed here. The "Name" field is by convention set to "3GM7" for "3GPP MTSI Release 7". The payload portion relates to data added in the "Application dependent data" field. This portion contains a header identification field (ID) followed by data (FIG. 5b). A plurality of ID values (on 4 bits) are specified in TS 26.114.

Certain ID values apply to all the codecs:
ID=0 0 0 0: padding (zero padding)
ID=0 0 0 1: redundancy activation request ("RedReq")—in this case, the data following the ID are on 12 bits, and each bit (i=1 to 12 starting from the end) indicates whether it is necessary to repeat packet N−i (if the bit is set to 1) or not (if the bit is set to 0).
ID=0 0 1 0: aggregation request ("FrameAggReq")—in this case, the data following the ID are on 4 bits, and only 4 values (among 16 possible values), corresponding to the transmission of 1 to 4 frames per packet, are predefined.

Other values apply to specific codecs:
ID=0 0 1 1: CMR request to change mode (coding rate) for AMR and AMR-WB ("AmrCmr")
ID=0 1 0 0: mode change request for EVS (EVS Primary)
ID=0 1 0 1: coded audio bandwidth change request for NB, WB, SWB or FB EVS ("EvsBandwidthReq")
ID=0 1 1 0: request to activate the EVS channel-aware mode (CAM) ("EvsParRedReq")
ID=0 1 1 1: request to switch from EVS Primary to EVS AMR-WB IO ("EvsIoModeReq")
ID=1 0 0 0: request to switch from EVS AMR-WB IO to EVS Primary ("EvsPrimaryModeReq")

It will be noted that it is possible to combine a plurality of RTCP APP requests in the same RTCP APP packet (for example a redundancy activation request and an aggregation request).

Thus, the current adaptation requests permitted by the CMR field in RTP packets for AMR, AMR-WB and EVS codecs are insufficient to perform every possible type of adaptation. In particular, the CMR is limited to changes in rate as specified by the receiver, for the AMR and AMR-WB codecs, and changes in rate, coded audio bandwidth and CAM mode control for the EVS codec.

The request by the receiver of a form of adaptation other than those permitted by CMR, such as frame aggregation or redundancy, requires the use of RTCP APP in voice-over-IMS applications (as specified in specification TS 26.114). However, to be usable, RTCP APP requires the AVPF profile.

Current telephony applications of VoLTE type (VoLTE standing for Voice over LTE (Long Term Evolution), which is a technique for transporting speech over the 4G LTE cell phone networks specified in GSMA IR.92) and of VoWifi type (VoWifi standing for Voice over Wi-Fi, which is a technique for transporting speech over Wi-Fi networks, and which is specified in GSMA IR.65) are based on the minimalist profile of voice over IMS, in which the AVPF profile is not permitted for voice; only the RTP AVP profile is permitted. This implies that RTCP packets of RTCP APP (or RTCP FB) type cannot be used in these applications.

When the AVP profile is permitted and depending on rate limitations (SR and RR fields in SDP), the actual uses of RTCP is limited at best to the transmission of "basic" reports of the following types: Sender Report (SR) and/or Receiver Report (RR), the network functionality of which is in particular to transmit keep-alive messages. "Sender-based" adaptation is therefore highly constrained by the fact that the feedback of the receiver in RTP is not regular enough and limited to a few "basic" quality indicators.

There is thus a need for a method that allows the receiver to reactively and robustly specify in-band (in an RTP stream) various types of adaptation, for any type of audio or video codec.

The present invention aims to improve the situation.

To this end, it provides a method for signaling an adaptation request that requests adaptation of the coding/decoding of real-time signals of a real-time communication session, on behalf of a receiving device, to a sending device. The adaptation request is such that it relates to a frame redundancy and/or aggregation request, that it is generated depending on the existence of a signaling parameter obtained in the phase of negotiation of the codecs used that took place during the initialization of the communication session and that it is transported via a real-time protocol of RTP type.

Thus, the use of the RTP protocol to request an adaptation makes it possible to obtain a reactive adaptation, contrary to the transmission of RTCP packets, which is not carried out in real-time.

The adaptation requests relate to adaptations different from the coding-mode changes of the prior art. This request signaling therefore allows the possibilities of reactive adaptation to be broadened.

The various particular embodiments mentioned below may be added independently or in combination to one another, in the steps of the signaling method defined above.

In a first embodiment, a field included in a mode-change request of CMR type is used to transport the adaptation request that requests adaptation of the communication session.

This type of request transport has the advantage of not increasing the size of the IP packets. It allows CMR values that have not been used in prior-art methods to be used to specify other types of adaptation.

In one particular embodiment in which the sending and receiving devices use coders/decoders of AMR or AMR-WB type, CMR codes 9 to 14 are used to code aggregation and redundancy requests that request aggregation and redundancies of various rates.

These codes are reserved for future uses and may advantageously define adaptations of aggregation or redundancy type.

In one particular embodiment in which the sending and receiving devices use coders/decoders of EVS type, CMR code values with T="111" and D other than "1111" are used to code the redundancy requests that request redundancies of various rates.

These codes are reserved for future uses and may advantageously define adaptations of aggregation or redundancy type.

In a second embodiment, a field of the padding request at the end of the signaling of the RTP protocol is used to transport the adaptation request that requests adaptation of the communication session.

This type of request transport also has the advantage of allowing both an aggregation and/or redundancy adaptation request and a coding-mode adaptation request be made. The use of a padding field at the end of the signaling then becomes useful to specify another type of adaptation.

The present invention also relates to a receiving device that transmits a signaling of an adaptation request that requests adaptation of the coding/decoding of real-time signals of a real-time communication session, to a remote sending device. This device is such that it comprises:
- a module for verifying the existence of a signaling parameter obtained in the phase of negotiation of the codecs used that took place during the initialization of the communication session;
- an adapting module able to determine an adaptation request relating to a frame aggregation and/or redundancy request; and
- a module for inserting the request into a payload format via a real-time protocol of RTP type.

This device has the same advantages as the method described above, which it implements.

The invention also relates to a communication terminal comprising a receiving device such as described.

It relates to a computer program containing code instructions for implementing steps of the signaling method such as described, when these instructions are executed by a processor.

Lastly, the invention relates to a processor-readable storage medium (which may or may not be integrated into the receiving device and which may optionally be removable) storing a computer program that implements a signaling method such as described above.

BRIEF DESCRIPTION OF THE DRAWINGS

Other features and advantages of the invention will become clearer on reading the following description, which is given merely by way of nonlimiting example, with reference to the appended drawings, in which:

FIGS. 3a to 3d illustrate the payload format for the AMR and AMR-WB codecs;

FIGS. 4a to 4g illustrate the payload format for the EVS codec;

FIGS. 5a to 5b illustrate prior-art examples of formats of RTCP APP packets such as described above;

DETAILED DESCRIPTION OF ILLUSTRATIVE EMBODIMENTS

Figure 1:
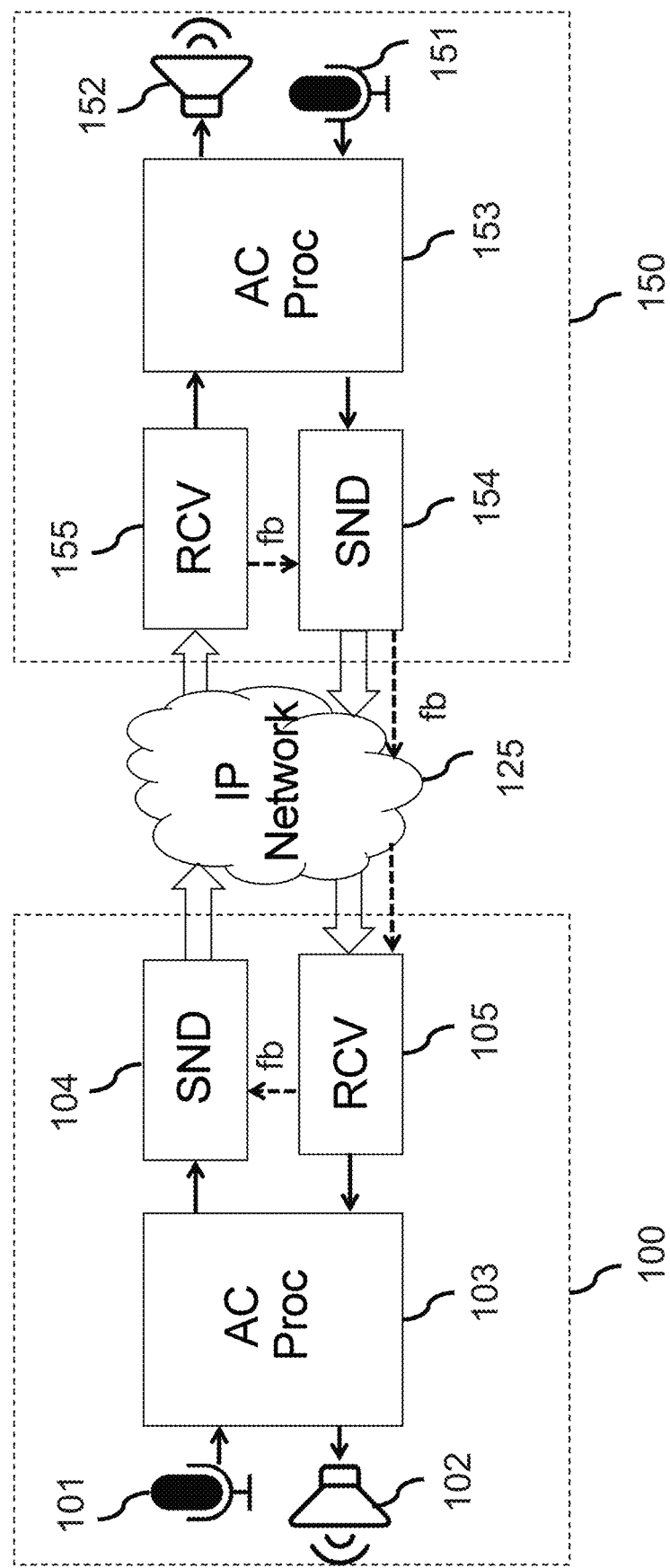
FIG. 1 illustrates a known prior-art voice-over-IP communication system, which was described above.
Figure 2A:
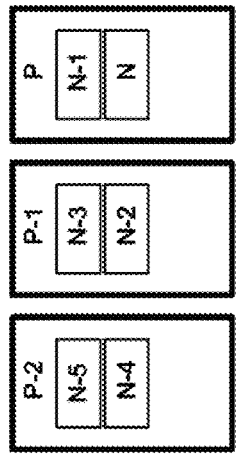
FIGS. 2a to 2d illustrate prior-art examples of IP packet formats in case of frame aggregation or redundancy, such as described above.
Figure 2B:
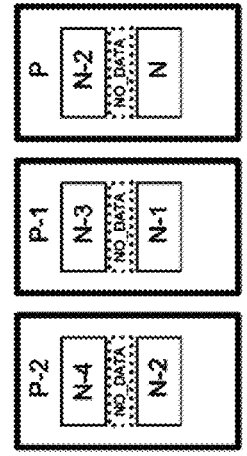
Figure 2C:
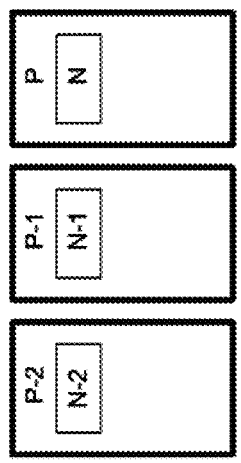
Figure 2D:
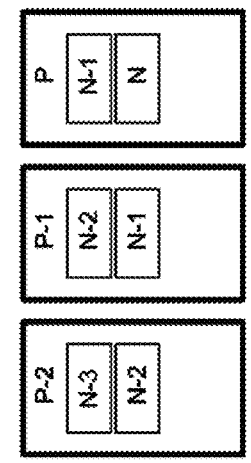
Figure 6:
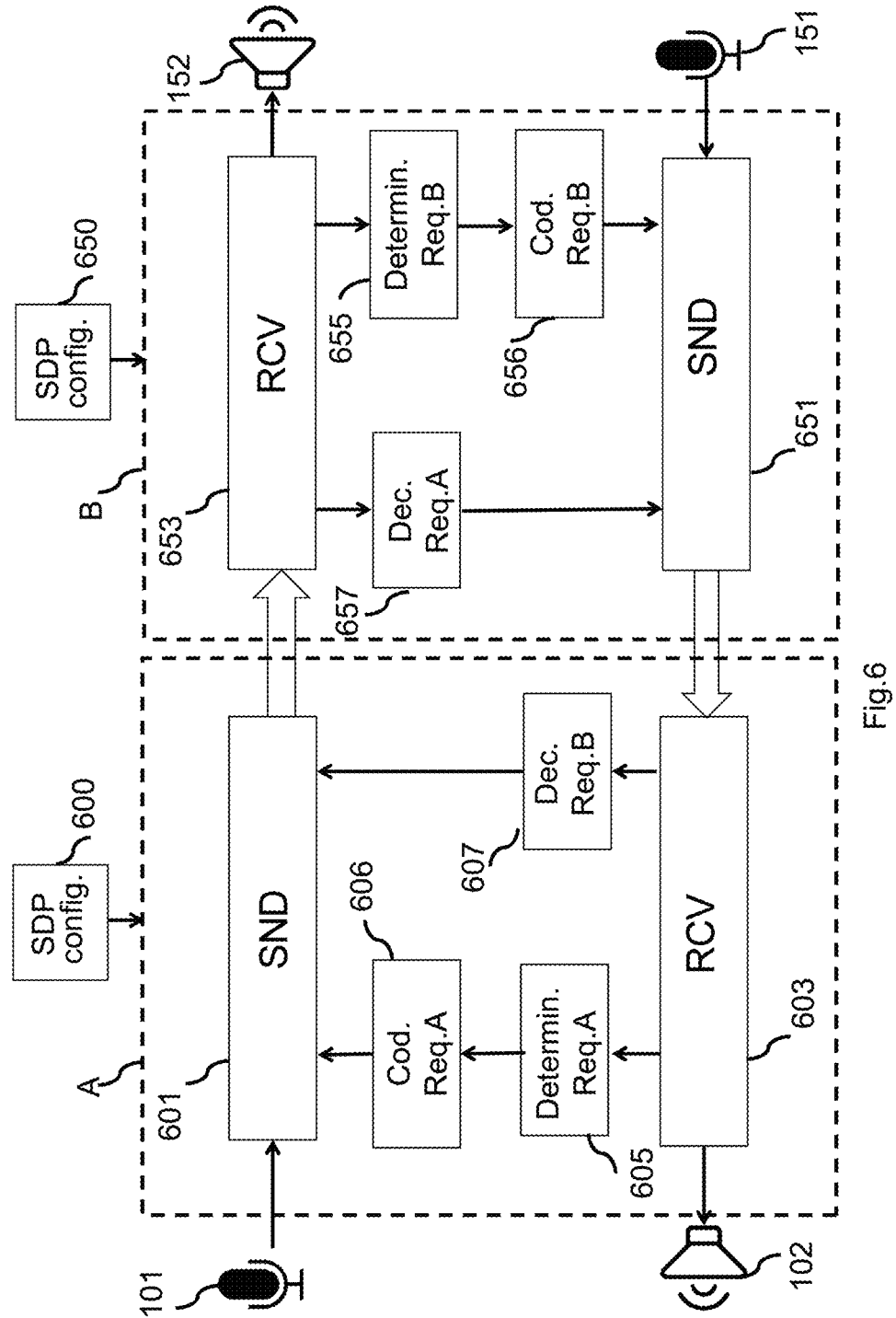
FIG. 6 illustrates one embodiment of a voice-over-IP communication system and of a signaling method according to the invention.

FIG. 6 illustrates an example of a system for bidirectional communication between two terminals A and B, implementing a request-signaling method according to one embodiment of the invention. As in FIG. 1, the microphones and loudspeakers (101, 151, 102, 152) have been shown. The acoustic processing operations and the network connecting the two terminals have not been shown in FIG. 6, for the sake of conciseness and clarity.

The terminal A comprises a sender 601 and a receiver 603 whereas the terminal B comprises a sender 651 and a receiver 653. The two terminals A and B are typically configured, depending on an exchange of one or more offers/one or more answers according to the SDP protocol, via the respective blocks 600 and 650. Typically, this SDP configuration is at least employed during the instantiation (initialization or re-initialization) of the sender and of the receiver; in variants of the invention this configuration may be considered to be internal to the terminal and to allow the SDP offer of the terminal and the answer thereto to be configured. In variants of the invention, other protocols for signaling media capacity/configurations (session descriptions) equivalent to or derived from SDP will possibly be used equivalently.

The senders perform the following functions: coding, generation of RTP packets by adding protocol headers and forming a payload corresponding to the coding format and to the transport adaptation (aggregation, redundancy, inter alia) if any is required and transmission of the packets.

The receivers perform the following functions: reception of the RTP packets, extraction of the fields of the RTP header, decoding of the payload (which may include the jitter buffer management) decoding of received frames and correction of lost-frame losses.

The terminals A and B comprise a request-decoding block (blocks 607 and 657). Various embodiments of the extraction and decoding of these adaptation requests will be described below with reference to FIGS. 8 to 10. The block 607 or 657 reads the relevant portion of the packet associated with the codec (AMR, AMR-WB or EVS). It is assumed here that the result of the decoding of the request by the blocks 607 and 657 is stored in an "adaptation_info" memory element containing a structure shared with the sending portion (blocks 601 and 651) and that this "adaptation_info" element itself comprises a stored element "adaptation_info.updated" that is equal to 1 when a (CMR, inter alia) request has been received and 0 otherwise. The block 601 or 651 verifies, before coding each new frame, whether the "adaptation_info.updated" value is 1 and if this is the case it configures the coding and optionally the transport (redundancy, aggregation) according to the embodiments of the invention, depending on complementary elements (for example "adaption_info.requested_bitrate" with respect to the requested bit rate, or "adaptation_info.red" with respect to the activation or not of redundancy, etc.) obtained from the request received and decoded by the block 607 or 657.

The terminals A and B comprise an adaptation block, 605 and 655, respectively, that implements a step of determining an adaptation to be made by the remote sender.

The terminals A and B also comprise a request-coding block, 606 and 656, respectively, that implements a step of coding an adaptation to be made by the remote sender. As for the request-decoding block, the result of the coding of the adaptation to be made by the remote sender, which is obtained from blocks 605 and 655, is stored in a memory element called "cmr_request", which contains a structure shared with the sending portion (blocks 601 and 651).

In one embodiment of the invention, the terminals A and B are configured (blocks 600 and 650) depending on the existence or not of an SDP signaling parameter called, in a first embodiment, "adapt_red" (via an SDP signaling read-out block 600 or 650) obtained in the phase of negotiation or configuration of the codecs used that took place during the initialization (or the re-initialization) of the communication session. The name "adapt_red" here makes reference to redundancy (in the sense of application-layer redundancy) but, as will be seen below, other names are possible, and are used in variants, without changing the nature of the invention. The configurations negotiated in the block 600 and 650 are stored in memory elements (not shown in the figure) that contain a structure shared between the sender and the receiver of each terminal A and B.

The configuration blocks 600 and 650 first verify whether the condition required to use an extended request, which is here the existence of an SDP signaling parameter called "adapt_red", is met.

The blocks 601, 603, 605, 606 and 607 in terminal A and the blocks 651, 653, 655, 656 and 657 in terminal B are considered to have access to a memory element that may be common to the transmission (601 and 606, for the example of terminal A) and to the reception (603, 605, 607 for the example of terminal A) or indeed separate between transmission and reception. This element is here called "adapt_enabled" and stores whether the SDP signaling parameter "adapt_red" was defined or not during the initialization (blocks 600 and 650, respectively) of the receiver, including blocks 603, 605 and 607 in terminal A and the blocks 653, 655 and 657 in terminal B. Here, adapt_enabled=0 if the parameter "adapt_red" is not present and 1 if it is present.

As explained above, the presence of the signaling parameter permits a type of extended adaptation request. It will be noted that it is also possible for the signaling parameter to be complemented by one or more complementary parameters, such as for example a "red-offset" parameter that allows the offset to be used in case of 100% redundancy (or the offsets to be used in case of redundancy of 200% or higher) to be indicated. In one embodiment, another memory element called "red_offset" is also accessible to all the blocks of a terminal A or B and allows the interval between the primary frames and the redundant frames to be configured depending on the SDP configuration (blocks 600 and 650).

In Appendix 1 an example of a conventional voice-over-IMS SDP offer is given.

This first example relates to an SDP offer that allows an audio call to be initiated with one of the following voice codecs: AMR, AMR-WB and EVS. The UDP port, the AVP profile and the payload type (PT) are indicated in media line "m". The payload type numbers are PT=97, PT=98 or 99, PT=100 or 101 for EVS, AMR-WB and AMR, respectively.

The maximum bandwidth of the media specified in the portion "b=AS:" may be modified depending on the requirements and here it corresponds to the maximum bit rate supported by EVS, which is 24.4 kbit/s over Ipv4.

The "rtpmap" and "fmtp" portions indicate the parameters of the format of the media. The frequency of the RTP clock for the listed codecs is 16 kHz for EVS and AMR-WB and 8 kHz for AMR. The "mode-change-capability" parameter negotiates the mode-change frequency: it is here set to 2, this indicating a change every 2 frames, in order to ensure maximum interoperability with GSM systems. Regarding the "max-red" parameter, which is 220, the latter allows the maximum interval of 220 ms between the original frame and the redundant frame to be used.

In Appendix 2, a second example ts given of an SDP offer according to one embodiment of the invention, in which a global adaptation parameter has been added to all the audio codecs, this parameter indicating the capacity to use an extended CMR field or another type of request (padding or RTP header extension) that will be described below, for the case of redundancy.

Specifically, for the remote sender to be able to make the adaptation decoded by the receiver, it is necessary for it to understand the adaptation request that has been transmitted to it. The SDP signaling obtained from the codec negotiation that took place during the initialization of the communication session defines this type of capacity for the codecs of the respective terminals.

In the case where a terminal according to the invention has the capacity to conform to an extended CMR with a view to commanding a frame redundancy or aggregation type change or another type of adaptation specific to the application, the SDP signaling comprises a defined parameter "adapt_red" (or one having another name in variants) that indicates that the terminal knows how to use an extended request that is formed, in the main embodiment, by extending the CMR field using the CMR codes "reserved" and/or "not used" in a predefined way.

As explained below, according to the invention, the value of the field "b=AS:" will possibly be modified when the SDP parameter "adapt_red" indicating an extended adaptation capacity is present, so that it is possible to use 100% redundancy effectively. Thus, to support a 100% redundancy with EVS with a mode at 13.2 kbit/s and an offset K it will typically be necessary to double the value of "b=AS:" defined for 13.2 kbit/s when a single frame is transported (30 for Ipv4) and to add the number of octets for indicating NO_DATA (i.e. K−1 octets of ToC); therefore, for K=2 b=AS: will be 61.

However, in the above example the field "b=AS:" is considered to remain defined with respect to the rate necessary to transport a single frame per packet at the maximum rate permitted by all the listed codecs.

In variant embodiments, the SDP parameter "adapt_red" will possibly be in the "fmtp" portion, and therefore specific to each codec.

In Appendix 3, a third example τs given of an SDP offer according to one embodiment of the invention, in which a global adaptation parameter has been added to all the audio codecs, this parameter indicating the capacity to use an extended CMR field or another type of request (padding or RTP header extension) that will be described below, for the more general case of redundancy and of aggregation.

The signaling parameter is this time called "ext_adapt" and there are two complementary parameters:
- a "red-offset" parameter that specifies two values, the first giving the offset to be used in case of 100% redundancy, the second indicating that it is also possible to signal (and to use) a 200% redundancy with the corresponding offset for the redundant second frame in a packet
- an "agg" parameter specifying the type of aggregations permitted, which are given in list format—here the singleton "1" indicates that only one frame may be transported per packet.

In other variants, other signaling syntaxes may be used: for example πt might be possible to use the signaling parameter as main indicator of the capacity to use extended adaptation requests, and then different additional parameters to activate or not the use of specific requests (redundancy, aggregation inter alia).

In variant embodiments, the SDP parameter "adapt_ext" will possibly be in the "fmtp" portion, and therefore specific to each codec.

In one embodiment of the invention, the blocks 605 and 655 are executed on each reception of a new RTP packet by the blocks 603 and 653, respectively. The receiver delivers at least the following information:
- the reception time of the RTP packets (in ms or according to the RTP clock of the media)
- the size of the RTP packets (in octets)
- information obtained from the RTP header:
  - the RTP sequence number
  - the RTP send time or timestamp From this information, the blocks 603 and 653 may estimate the following indicators:
- Loss rate τ over a predetermined horizon (for example about the last 5 seconds). An example of an embodiment is given in appendix A.3 of RFC 3550 in which the quantity "fraction" is computed for the RTCP SR/RR reports. In variants, other estimating methods will be used.
- Available bandwidth β, estimated in kbit/s at the IP level. Various estimating methods exist and the example τs given here of estimation based on a Kalman filter, as described in the article by G. Carlucci et al., "Analysis and Design of the Google Congestion Control for Web Real-time Communication (WebRTC)", Proc. MMSys, May 2016. The estimated bandwidth is here considered to be of the form: $\beta=\beta_0+\beta_{codec}$, where $\beta_{codec}$ is the bit rate of the codec (coding mode) and $\beta_0=\beta-\beta_{codec}$ is the portion of the bandwidth used in addition to the coding bit rate (due to the protocol headers and potentially to the use of extended requests).

Below, two cases have been considered for the AMR and AMR-WB codecs:

When adapt_enabled=0, the adaptation of the AMR and AMR-WB codecs is limited to a "basic" operation employing the existing CMR:

A single frame is transported per packet, the adaptation requests for activating or deactivating the redundancy and aggregation are not available and the adaptation is limited to sending a CMR to change the coding rate (mode) among the list of rates (modes) permitted by the session, depending on the SDP configuration (blocks 600 and 650). This list is denoted $\{R_0, \ldots, R_{M-1}\}$ where M is the number of permitted modes. For example, for AMR it is recommended to negotiate the M=4 following modes {4.75, 5.9, 7.4, 12.2} and for AMR-WB the M=3 following modes {6.6, 8.85, 12.65} in order to maximize interoperability with 3G systems but it is also possible in AMR-WB to negotiate an open offer/answer with M=9 modes {6.6, 8.85, 12.65, 14.25, 15.85, 18.25, 19.85, 23.05, 23.85} because the 3 lowest rates {6.6, 8.85, 12.65} are also present in these 9 modes and a CMR may limit the maximum rate to the highest 12.65 kbit/s for interoperation; however, there are also cases where only N=1 single mode is permitted, for example {12.2} for AMR.

If N=1, the blocks 603 and 653 generate no adaptation requests via the memory element "cmr_request" (output of the blocks 605 and 655) other than a CMR indicating the rate $R_0$ or indeed a CMR with a code set to (NO_REQ). Below it is assumed that N>1 and an example of an adaptation decision algorithm is given below. In variants of the invention other criteria and other deciding methods will possibly be used without changing the nature of the invention.

The coding rate of the preceding frame of index N−1 is denoted $R_i$, where i denotes the index of one of the elements of $\{R_0, \ldots, R_{M-1}\}$, corresponding to the rate of the preceding frame.

If the loss rate is too high (for example τ10%) it is assumed that the estimation of available bandwidth is not reliable enough and the criterion β, is not used; in this case, if in addition to the condition of a loss rate that is too high, the last change in rate took place 50 frames (1 second) ago for example, the rate is lowered by precaution, by selecting the rate $R_j$ immediately below the preceding rate, j being such that j=max(i−1,0) (the operator max(·) here serves to ensure that the rate does not drop below the minimum rate $R_0$) and this mode decision of the block 605 or 655 is converted by the sending portion into a CMR code (block 606 or 656) indicating the rate $R_j$.

When the loss rate is not too high (for example τ<10%) and the last change in rate took place 50 frames (1 second) ago for example, the mode decision of block 605 or 655 corresponds to the coding mode $R_j$ immediately below the available bandwidth i.e. $j=\arg \max_k \{k|R_k \delta \beta_0\}$ if $\beta_0 R_0$ and j=0 otherwise.

In variants of the invention, the condition of 50 frames will possibly be modified—it here serves to stabilize the decision and prevent too frequent changes.

The blocks 605 and 655 store in memory the current mode decision via a stored element that is here denoted "cmr_request" which contains an element "cmr_request.updated" and an element "cmr_request.requested_bitrate" and these blocks verify the received packet sizes. If the remote sender has not executed the request of the local receiver (other than NO_REQ)—which is verified by comparing the rate of the codec used (derived from the size of the received packets) with the rate associated with the sent CMR—the last mode decision will be repeated in order to ensure a robust transmission of this decision. If no decision to change the current mode is necessary, the block 605 or 655 will indicate that a CMR must be sent using a "cmr_request.updated" element set to 1, "updated=0" otherwise being required. In variants of the invention, the decision will be repeated a predefined number of times (for example 3 times).

At the moment that each new frame is coded, the sender 601 (or 651) accesses (in general in parallel with the block 605 or 655, via a "mutex" or "critical section") the stored element "cmr_request.updated" and if this element is equal to 1, the sender will add a CMR field to the current packet with the corresponding value of "cmr_request.requested_bitrate". Otherwise, if the element "cmr_request.updated" is equal to 0, the sender will indicate either a CMR of "NO_REQ" type (no request) for AMR, AMR-WB or EVS, or provide no CMR if the EVS codec is configured to not send a CMR when no request is to be sent.

When adapt_enabled=1, the adaptation of the AMR and AMR-WB codecs is extended:

Blocks 601 and 651 comprise a buffer (a queue) of coded frames in order not to have to recode the same frame a plurality of times. This buffer of coded frames is here considered to be configured, according to the SDP parameters (block 600 and 650), by computing the maximum number of coded frames to be stored according to the parameters "max-red" and "maxptime". For example, if max-red=220 and/or maxptime=240, the buffer will possibly be adjusted to store up to 12 coded frames.

In addition, blocks 603 and 653 read out the ToC field and detect the one or more frames in the current packet, in order to manage the case of redundancy or aggregation. If more than one frame is detected in the current packet, blocks 603 and 653 separate them and insert the various coded frames into the reception-end jitter buffer depending on the type of transport, for example:

If the current packet contains an aggregation of frames, the frames of the current packet are separated and the frames are inserted depending on the timestamp of the RTP packet and on the time interval separating these frames If the current packet contains a redundancy, the receiver verifies whether the primary redundant frame corresponding to a given frame has already been received and if this is the case deletes the duplicate, otherwise the frame is inserted into the jitter buffer.

These two cases may also be combined.

Details regarding the adaptation of the jitter buffer and the impact on the algorithm for managing the jitter buffer of the various types of adaptation are not given here. For example, in the case of redundancy or aggregation, it is important for the jitter buffer to take into account the transport configuration used, in order to adjust the audio-signal generation delay with a view to exploiting redundant frames or to adjusting the estimation of the network jitter.

An example of an extended adaptation algorithm is given below, firstly in the case of redundancy.

The list of modes will once again be $\{R_0, \ldots, R_{M-1}\}$, where M is the number of permitted modes.

If the loss rate is too high (for example $\tau \geq 10\%$) and the last change in rate took place 50 frames (1 second) ago for example, the adaptation decision consists in activating the 100% redundancy. In one example, the rate 2×R immediately below the current rate will be selected and if no rate 2×R meets this condition the lowest rate 2×R will be selected. In this case, the "cmr_request.updated" element is set to 1 and the additional elements "cmr_request.requested_bitrate" and "cmr_request.red" are set to R and 1, respectively, in order to indicate that a request with 100% redundancy with the rate R must be sent.

If the loss rate is not too high (for example $\tau < 10\%$), the adaptation decision consists in deactivating the redundancy. In this case, the algorithm described above is again used: when the loss rate is not too high (for example $\tau < 10\%$) and the last change in rate took place 50 frames (1 second) ago for example, the mode decision of block 605 or 655 corresponds to the coding mode $R_j$ immediately below the available bandwidth i.e. $j=\arg \max_k \{k|R_k \beta_0\}$ if $\beta_0 R_0$ and j=0 otherwise. In this case, the "cmr_request.updated" element is set to 1 and the additional elements "cmr_request.requested_bitrate" and "cmr_request.red" are set to R and 0, respectively, in order to indicate that a conventional CMR request must be sent.

The adaptation decision is therefore represented, in one example, by way of a stored element "cmr_request" that comprises a plurality of elements:

"cmr_request.updated": this value is set to 1 if a new decision must be transmitted "cmr_request.requested_bitrate": this value indicates the coding rate to be used in variants of the invention, other criteria and other decision methods will possibly be used without changing the nature of the invention. In particular, in case of aggregation, a stored element for example called "cmr_request.agg" will be defined to indicate that an aggregation request must be sent.

The adaptation decision (blocks 605 and 655) for the EVS codec is similar to the description given below for the AMR and AMR-WB codecs. However, a plurality of specificities must be taken into account:

the EVS codec allows the CAM mode, which is a "robust" mode of 13.2 kbit/s in WB and SWB, to be activated—this mode is normally configured using SDP (see Appendix A of TS 26.445 for the details of the parameter "ch-aw-recv").

All the (NB, WB, FWB and FB) audio bandwidths are not supported at all rates (see table A.6 of TS 26.445). Thus, to generate a CMR, if the session permits an audio bandwidth range (for example bw=nb-swb), if the current rate is SWB-9.6 kbit/s, and if the adaptation decides to drop to 8 kbit/s, it will be necessary to generate a CMR to indicate the WB-8 kbit/s mode, and therefore the change in rate may involve in the case of the EVS codec a change of coded audio bandwidth, contrary to AMR or AMR-WB.

In the described embodiment, no adaptation decision to request a CAM mode will be generated by the blocks 605 and 655 to simplify the implementation. In variants, it will be possible to activate the CAM mode if for example the loss rate is for example <6% and if the estimated available bandwidth is >13.2 kbit/s, and 100% redundancy will be used only for a loss rate >6%.

In examples of embodiments of the invention, the adaptation to be made is of frame-aggregation type, according to various embodiments that will be described below, or indeed of frame-redundancy type, also according to various embodiments described below, or even another type of adaptation specific to the application. The adaptation may comprise both aggregation and redundancy or another specific type of adaptation.

These types of adaptation are for example used to modify the packet rate, to correct erroneous received or lost frames, etc. this in general not being possible with an adaptation limited to the modification of the coding rate (except for the EVS codec in which the CAM mode partially allows the problem of frame losses to be addressed, but this mode is specific to WB and SWB EVS at 13.2 kbit/s and is typically less effective than 100% redundancy at high loss rates).

The operating principle of the blocks of terminals A and B remain the same: their operation depends on the SDP configuration and on the memory element "adapt_enabled".

An adaptation request corresponding to the adaptation determined in 605 and 655 is inserted into the current RTP packet by the respective blocks 606 and 656 used to code the request.

Various ways in which these adaptation requests may be inserted are described below with reference to FIGS. 8 to 10.

The respective blocks 607 and 657 for decoding the request allow the request received, in an RTP packet, from a remote receiver, to be extracted and decoded so that the senders can make the requested adaptations. In particular, an example of an embodiment in which the sender accesses stored elements "adaptation_info" and "cmr_request" and optionally additional stored elements is considered here.

Thus, FIG. 6 illustrates the steps implemented during the signaling method, namely, a step (600, 650) of verifying the existence of a signaling parameter obtained in the phase of negotiation or configuration of the codecs used that took place during the initialization of the communication session, a step (605, 655) of determining an adaptation request relating to a frame aggregation and/or redundancy request and a step (606, 656) of inserting the request into a payload format via a real-time protocol of RTP type. In variants of the invention, other ways of exchanging information other than shared structures (taking the form of stored elements) such as "cmr_request", "adaptation_info" or "adapt_enabled" will possibly be used.

Figure 7:
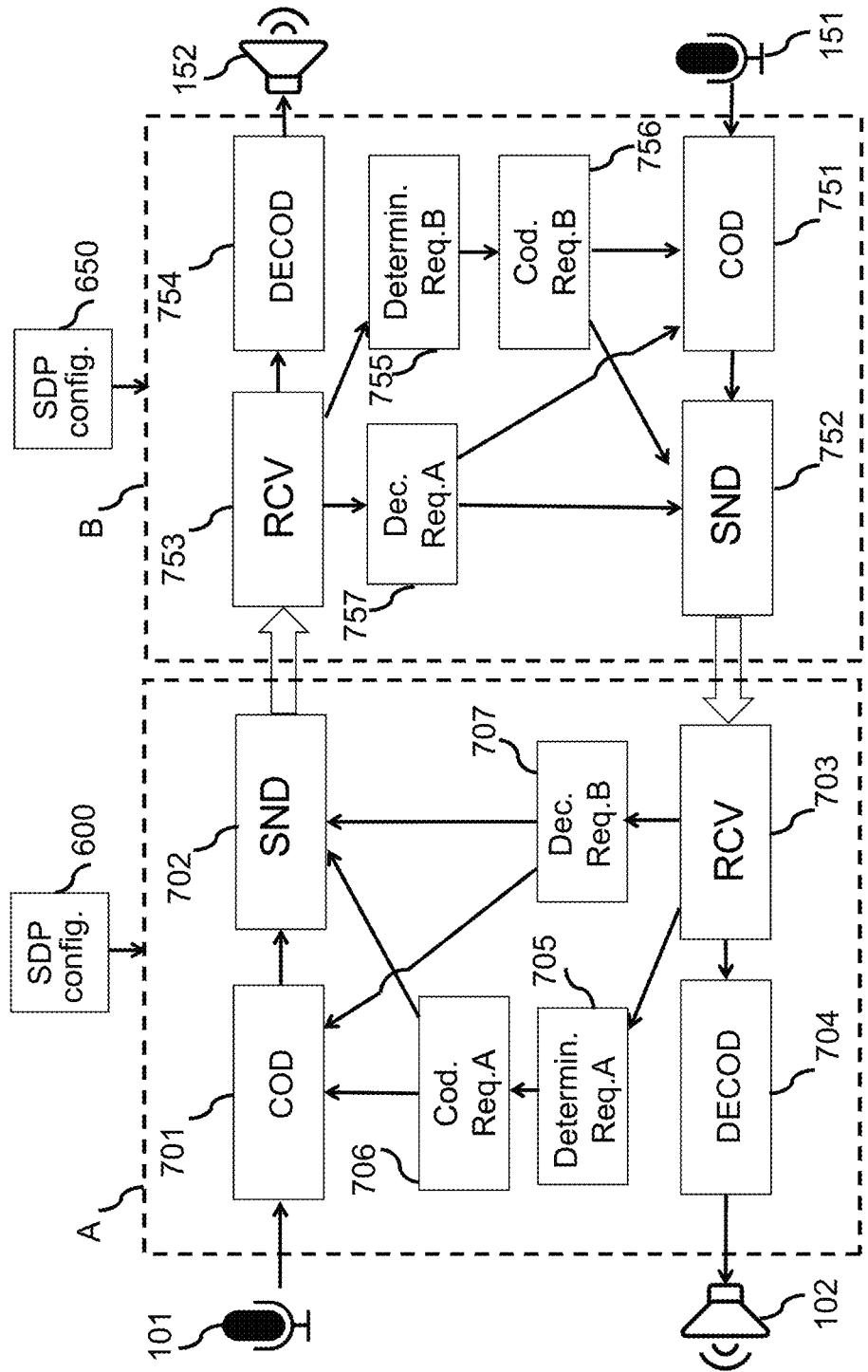
FIG. 7 illustrates a more detailed embodiment of a voice-over-IP communication system according to the invention.

FIG. 7 illustrates an embodiment that is more detailed than that of FIG. 6 described above. In this embodiment, the sender blocks of FIG. 6 are divided into coding blocks (701 and 751) and sending blocks (702 and 752) that implement the generation and transmission of RTP packets. The receiver blocks of FIG. 6 are divided into decoding blocks (704 and 754) that may manage the jitter-buffer, decode the received frames and correct for lost-frame and reception losses (703 and 753). In a VoIP application, the blocks 701 and 702 (or 751 and 752) are executed in parallel in multi-thread with the portion related to coding (701 or 751), which depends on events related to the input soundcard (connected to the block 701), and with the portion that transmits to the network (block 702 or 752), which depends on network events; in the same way, in the receiving portion, the packets (703 and 753) may be received in parallel to the audio generation (704 and 754).

The blocks 705 and 755 for determining the adaptation to be made have the same functions as those described for blocks 605 and 655 with reference to FIG. 6.

FIG. 7 shows that it is possible to distribute the functions that create the payload format between the coding blocks (701, 751) and the sending blocks (702, 752) depending on which one of these blocks forms the payload. The invention applies to both cases.

The requests for these adaptations thus determined are coded using blocks 706 and 756 and inserted into an RTP packet either by the coding module 701 or 751 or by the sender 702 or 752 that implements the encapsulation into packets.

The blocks 707 and 757 have the same functions as the blocks 607 and 657 described with reference to FIG. 6. Depending on the method employed to transport the adaptation request, the decoded request will be sent either to the coding block or to the sending block of the sending portion.

Figure 8:
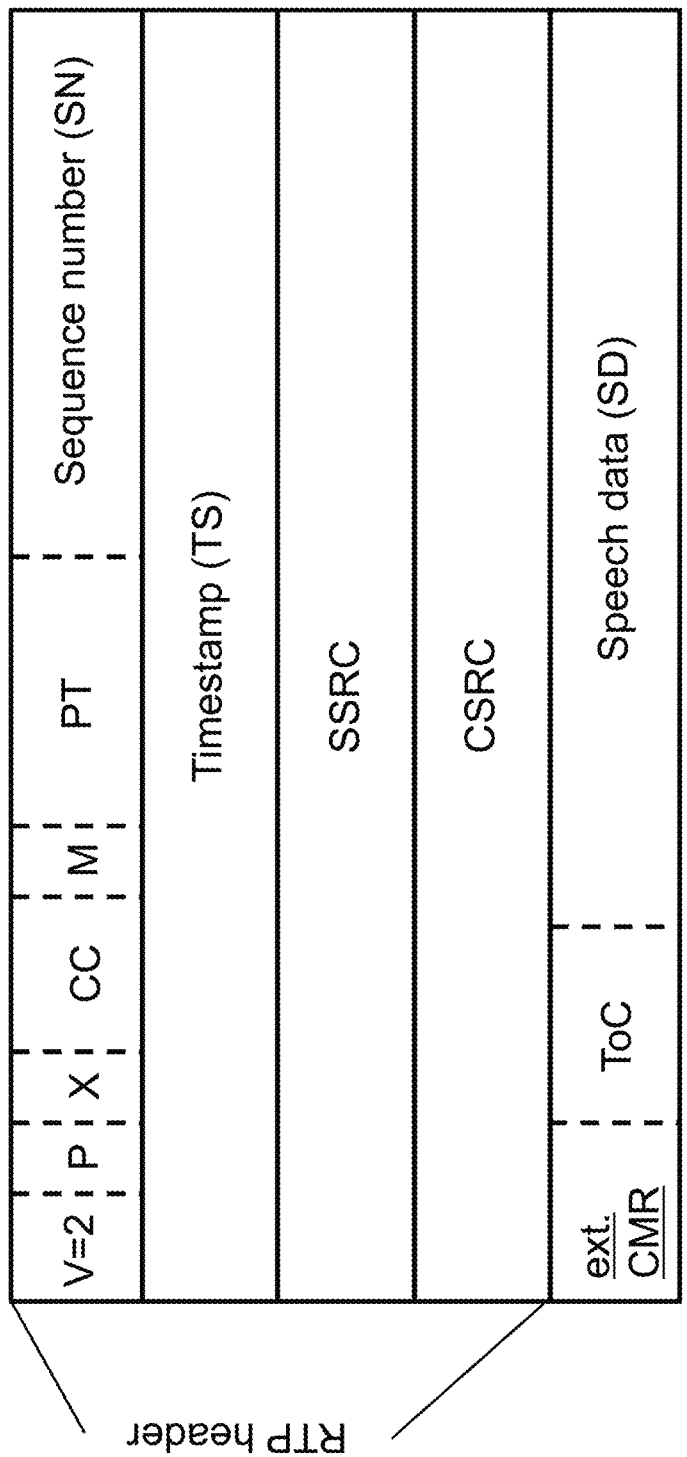
FIG. 8 illustrates a payload format used, according to a first embodiment of the invention, to transport an adaptation request.

With reference to FIG. 8, the way in which the CMR codes such as defined below are used will now be described.

In a first embodiment, the adaptation request determined by the receiver of a terminal is coded in a field of a mode-change request of CMR type in order to be transported to the sender of the remote terminal.

In this embodiment, the signaling of the negotiation between the codecs of the terminals that takes place on initialization of the communication session defines an adaptation parameter "adapt_red" or "adapt_ext" or another name identifying a capacity to use an extended request as seen above, allowing a CMR field that is comprehensible both to the receiver and to the sender of the remote terminals to be employed.

When this parameter is defined, a CMR code field is defined to specify the desired type of adaptation.

For the AMR, AMR-WB and EVS codecs such as described above, codes that are reserved for future use or that are unused are employed, according to the invention, to make extended mode-change requests. These codes are limited to a few values for the aforementioned codecs.

Two cases of operation are distinguished between:
When adapt_enabled=1, CMR codes defined as "reserved", "not used" or "for future use" are used to make an extended request.
When adapt_enabled=0, only the CMR codes defined in RFC 4867 for AMR and AMR-WB and TS 26.445 Appendix A for EVS are used. Reception-end (blocks 607 and 657) if CMR codes defined as "reserved", "not used" or "for future use" are received, they are ignored.

The coding format of these requests included in "reserved" or unused CMR fields is described here, for one embodiment.

For the AMR and AMR-WB codecs, the CMR values between 8 and 14 (inclusively) and between 9 and 14 (inclusively) are reserved for future use. They are therefore conditionally used when a signaling parameter according to the invention is defined during the codec negotiation and their use is dedicated to signaling redundancy, aggregation or other types of request.

Figure 4A:
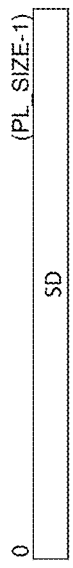
Figure 4B:
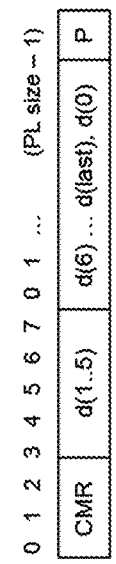
Figure 4C:
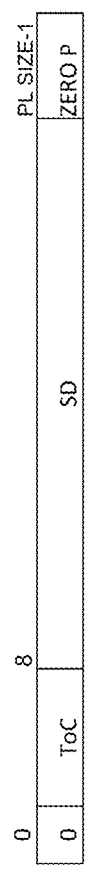
Figure 4D:
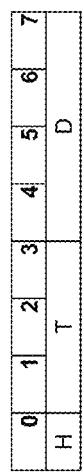
Figure 4E:
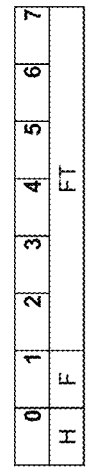
Figure 4F:
Figure 4G:
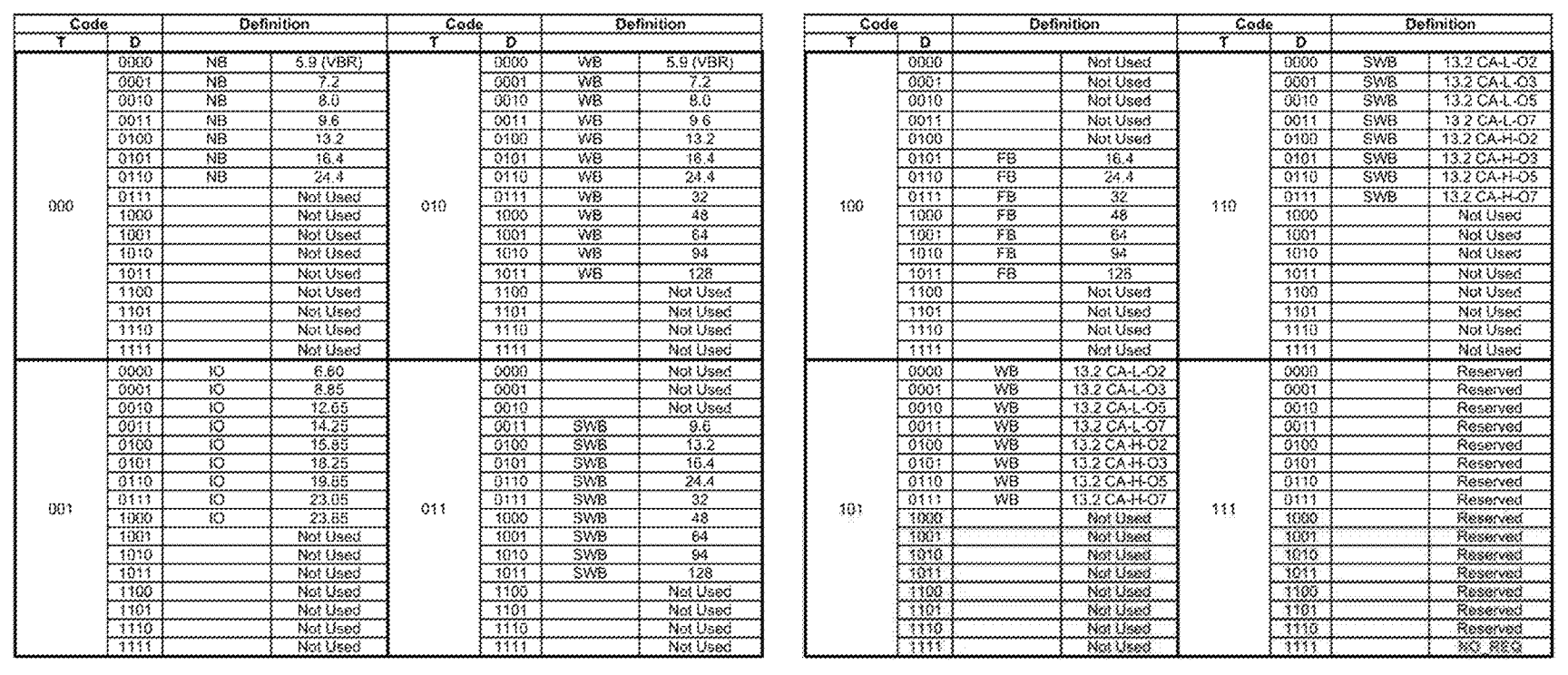

Likewise, for the EVS codec, as described with reference to FIG. 4g, the values with T="111" and D other than "1111" are marked as reserved, this leaving 15 possible values.

In one variant embodiment, values marked as not used may also be used, this then considerably increasing the number of possible free codes; this is however applicable only to the EVS codec.

For a redundancy adaptation (mainly used to replace missing frames) 100% redundancy consists in repeating a past frame (with the offset K) in the current packet P. When the frame losses are random (uniform law with independent and identically distributed or i.i.d. values), this 100% redundancy allows a loss rate of 10% to be converted into a loss rate of 1%.

For cellular networks of LTE type in which QOS management mechanisms are already in place and negotiated when making a telephone call, this 100% redundancy level is, in a first example of an embodiment, considered to be sufficient and it is considered not necessary to consider cases of higher redundancy (e.g. 200 or 300%).

In the example described here, it is considered to be unnecessary to combine both frame aggregation and redundancy.

Here, a constrained version of the signaling of the frame aggregation or redundancy request is developed.

The possible cases of redundancy for the AMR, AMR-WB and EVS codecs are described here for a maximum rate associated with the payload format of about 12.2 kbit/s for AMR, 12.65 or 23.85 kbit/s for AMR-WB and 13.2 or 24.4 kbit/s for EVS, respectively.

Table 1 below shows, for an AMR codec with a rate of about 12.2 kbit/s, that the redundancy is limited to 3 possible redundancy cases, denoted "2×R" where R is the repeated rate. It will be noted here that the offset is not specified and in practice the rate associated with the payload format will be higher than twice R if ToC information of NO_DATA type must be inserted to indicate the offset in the payload.

It will be noted that when redundancy is activated, if the current rate of packet P is a rate of 12.2 kbit/s and if a redundancy of 2×5.9 kbit/s is switched to starting from the following packet P+1, the first packet (of index P+1) normally contains the current frame with a rate at 5.9 kbit/s and the preceding frame at a rate of 12.2 kbit/s. It is only in the following packet (of index P+2) that there will be 2 frames at 5.9 kbit/s. For the first packet, the rate is then higher than the maximum permitted rate. If the value of "b=AS:" of the SDP parameter allows it, this method is used for the first transition packet otherwise, if this value does not permit the overload, to prevent a temporary overload (12.2+5.9), the packet P+1 will contain only the frame coded at 5.9 kbit/s.

TABLE 1

| AMR | 100% redundancy possible (<12.2) |
|---|---|
| 4.75 | x |
| 5.15 | x |
| 5.9 | x |
| 6.7 | (x) |
| 7.4 | (x) |
| 7.95 | |
| 10.2 | |
| 12.2 | |

It is possible to envision allowing 2×6.7 and 2×7.4 redundancy depending on the value of "b=AS:".

Likewise, in the case of a frame aggregation adaptation, for the same maximum rate limitation, for the AMR codec, the same cases as those shown in table 1 above are found to be usable.

It is therefore possible to define the following CMR codes (table 2) for the AMR codec with "RED" for redundancy:

TABLE 2

| CMR Code | AMR request |
|---|---|
| 9 | RED 2 × 4.75 |
| 10 | RED 2 × 5.15 |
| 11 | RED 2 × 5.9 |
| 12 | RED 2 × 6.7 |
| 13 | RED 2 × 7.4 |
| 14 | Reserved |

In variants, in particular when no complementary SDP parameter allows the redundancy offset to be specified, it will be possible to use the CMR codes specified in table 2a for AMR. This allows both the redundancy rate and the offset to be used (here 1 or 3) to be specified. The rates of 5.15 and 6.7 in this example will also be noted.

TABLE 2a

| CMR Code | AMR request |
|---|---|
| 9 | RED 2 × 4.75, offset 1 |
| 10 | RED 2 × 5.9, offset 1 |
| 11 | RED 2 × 7.4, offset 1 |
| 12 | RED 2 × 4.75, offset 3 |
| 13 | RED 2 × 5.9, offset 3 |
| 14 | RED 2 × 7.4, offset 3 |

In other variants, it will also be possible to combine redundancy and aggregation with two frames per packet as shown in the table 2b, with "Agg" for aggregation.

TABLE 2b

| CMR code | AMR request |
|---|---|
| 9 | RED 2 × 4.75 |
| 10 | RED 2 × 5.15 |
| 11 | RED 2 × 5.9 |
| 12 | Agg 2 × 4.75 |
| 13 | Agg 2 × 5.15 |
| 14 | Agg 2 × 5.9 |

It will be recalled here that the CMR codes are listed here in order to allow a "generic" request independent of the permitted rates (SDP parameter "mode-set" for AMR). Of course, the blocks 605 and 606 (and 655 and 656) are constrained by the rates negotiated for the session, and therefore certain codes may not be used.

It is here assumed that the offset for the redundancy is specified during the SDP negotiation with a parameter that may be named "red-offset" and that will typically be associated with the SDP parameter allowing the CMR code to be used to be identified. If this "red-offset" parameter is not available, a request-signaling solution such as for example given in table 2a will possibly be used.

Thus, if adapt_enabled=1, the blocks 605 and 655 (or 705 and 755) will verify the value of "cmr_request.updated" and if this value is set to 1, these blocks will convert the complementary data stored in "cmr_request". In particular, for the case of table 2, if cmr_request.red=1, the element "cmr_request.requested_bitrate" will be used to find the CMR code from 9 to 13. If cmr_request.red=0, the element "cmr_request.requested_bitrate" will be used to find the CMR code from 0 to 7 that corresponds to the rate.

It is assumed here that the constraints imposed by the SDP parameters (b=AS, maxptime, max-red, etc.) have already been taken into account by the decision blocks 605 and 655.

In table 3 below, the same approach is now illustrated for the codec AMR-WB with provision made for the two maximum rates.

TABLE 3

| AMR-WB | 100% redundancy possible (<12.65) | 100% redundancy possible (<23.85) |
|---|---|---|
| 6.6 | x | x |
| 8.85 |  | x |
| 12.65 |  | (x) |
| 14.25 |  |  |
| 15.85 |  |  |
| 18.25 |  |  |
| 19.85 |  |  |
| 23.05 |  |  |
| 23.85 |  |  |

Depending on whether the maximum rate of the codec is 12.65 kbit/s or 23.85 kbit/s and depending on the value of "b=AS:" and the rates permitted in the session (see the parameter "mode-set"), it may be seen that 100% redundancy allows only one case (2×6.6) for the rate 12.65 kbit/s or three cases for the rate 23.85 kbit/s.

It will be noted that the 3rd case of 100% redundancy for 12.65 kbit/s exceeds a little the nominal rate of 23.85 kbit/s and, in this case, it is necessary to ensure that the service is suitably dimensioned for a rate slightly higher than the "normal" rate of the AMR-WB codec, this typically being achieved by modifying the value of "b=AS" in the signaling of the SDP negotiation to a higher value.

It is therefore possible to define the following CMR codes (table 4) for the AMR-WB codec:

TABLE 4

| CMR code | AMR-WB request |
|---|---|
| 9 | RED 2 × 6.6 |
| 10 | RED 2 × 8.85 |
| 11 | RED 2 × 12.65 |
| 12 | Agg 2 × 6.6 |
| 13 | Agg 2 × 8.85 |
| 14 | Agg 2 × 12.65 |

In variants, the space in which extended requests are signaled will possibly be restricted to redundancy and various offsets, for example as shown in table 4a.

TABLE 4a

| CMR code | AMR-WB request |
|---|---|
| 9 | RED 2 × 6.6, offset = 1 |
| 10 | RED 2 × 8.85, offset = 1 |
| 11 | RED 2 × 12.65, offset = 1 |
| 12 | RED 2 × 6.6, offset = 3 |
| 13 | RED 2 × 8.85, offset = 3 |
| 14 | RED 2 × 12.65, offset = 3 |

In variants of the invention, the order of these values will possibly be modified and certain values will possibly be deleted in all the tables. It will also be possible to define additional variants for example integrating 200% redundancy or options for the value of the redundancy offset.

Once again, if adapt_enabled=1, the blocks 605 and 655 (or 705 and 755) will verify the value of "cmr_request.updated" and if this value is set to 1, these blocks will convert the complementary data stored in "cmr_request". In particular, for the case of table 4, if cmr_request.red=1, the element "cmr_request.requested_bitrate" will be used to find the CMR code from 9 to 11. If cmr_request.red=0, the element "cmr_request.requested_bitrate" will be used to find the CMR code from 0 to 8 that corresponds to the rate.

It is assumed here that the constraints imposed by the SDP parameters (b=AS, maxptime, max-red, etc.) have already been taken into account by the decision blocks 605 and 655.

The same approach may be used for the EVS codec. However, unlike the AMR and AMR-WB codecs, the EVS codec comprises a plurality of operating modes: EVS-NB, EVS-WB, EVS-SWB, EVS-FB and EVS AMR-WB IO, and specific modes such as VBR or CAM.

The case for EVS AMR-WB IO is considered here to be derivable from the AMR-WB case discussed above. For the "EVS Primary" portion, setting aside the coded audio bandwidth, it is possible to define the following table (table 5):

TABLE 5

| EVS | A1 100% redundancy possible (<13.2) bw = nb – swb | A2 100% redundancy possible (<24.4) bw = nb – swb | B1 100% redundancy possible (C13.2) bw = swb | B2 100% redundancy possible (<24.4) bw = swb |
|---|---|---|---|---|
| 5.9-VBR | x | [x] |  |  |
| 7.2 | (x) | x |  |  |
| 8 |  | x |  |  |
| 9.6 |  | x | (x) | x |
| 13.2 |  | (x) |  | (x) |
| 16.4 |  |  |  |  |
| 24.4 |  |  |  |  |

This table is here based on the GSMA specification IR.92 V11.0 (15 Jun. 2017) in which 5 configurations (profiles) are defined for EVS. Only the four configurations (A1, A2, B1, B2) that allow an adaptation space of redundancy or aggregation type to be obtained are considered here.

It will be noted that the use of redundancy or aggregation in the VBR mode is debatable and potentially complicates the implementation of the encapsulation into packets. For this reason, the VBR mode is indicated here with the notation "[x]" in table 5. Here consideration will be restricted to fixed rates. However, in variants it will also be possible to include the VBR mode in CMR codes according to the invention.

The number of CMR codes reserved for the EVS codecs is 15.

For the AMR-WB codecs, it has been seen that there are 6 cases. For the EVS codec, adaptation may be limited to the NB, WB and SWB modes because the FB mode starts only at 16.4 kbit/s. It is therefore possible to define the following CMR codes (table 6) for the EVS codec:

TABLE 6

| CMR code | EVS request |
|---|---|
| 111 0000 | RED 2 × 7.2-NB |
| 111 0001 | RED 2 × 8-NB |
| 111 0010 | RED 2 × 9.6-NB |
| 111 0011 | RED 2 × 13.2-NB |
| 111 0100 | RED 2 × 7.2-WB |
| 111 0101 | RED 2 × 8-WB |
| 111 0110 | RED 2 × 9.6-WB |
| 111 0111 | RED 2 × 13.2-WB |
| 111 1000 | RED 2 × 7.2-SWB |
| 111 1001 | RED 2 × 8-SWB |
| 111 1010 | RED 2 × 9.6-SWB |

TABLE 6-continued

| CMR code | EVS request |
| --- | --- |
| 111 1011 | RED 2 × 13.2-SWB |
| 111 1100 | RED 2 × 6.6 |
| 111 1101 | RED 2 × 8.85 |
| 111 1110 | RED 2 × 12.65 |

It may be seen that this table does not comprise code values for an aggregation adaptation. Details are not given here of the values chosen among the "Not used" values to make the extended requests, for the sake of conciseness. However, the examples given for the AMR and AMR-WB codecs may be extended to the EVS codec.

In one possible embodiment, it is possible, in this case, to use the "Not used" CMR values to define aggregation modes.

In variants of the invention, the order of these values will possibly be modified and certain values will possibly be deleted or replaced. In particular, in variants of the invention, for the AMR, AMR-WB and EVS codecs, a CMR code will possibly be reserved for signaling types of adaptation other than redundancy and aggregation.

In other variants of the invention, aggregation will not be used and instead CMR codes will possibly be reserved for the (limited) cases of 200% redundancy (this approximately tripling the bit rate): AMR at 4.75 kbit/s, AMR-WB at 6.6 kbit/s, EVS from 7.2 to 8 kbit/s for Primary (for NB and WB bandwidths), at 9.6 kbit/s for Primary (NB, WB and SWB bandwidths) and at 6.6 kbit/s for EVS AMR-WB IO.

In the case of the AMR and AMR-WB codecs, the CMR field is always present, and for EVS it is also always present in the case of EVS AMR-WB IO (on 3 bits in compact mode and one octet in header-full mode); however in EVS Primary modes, whether or not it is present depends on the SDP parameter called "cmr" (see Appendix A of TS 26. 445 for the associated details).

The CMR field is a header of the payload data of the RTP payload format for the AMR, AMR-WB and EVS codecs; the existing field for these codecs remains the same, as indicated in FIG. 8. However, this field is designated "ext.CMR" or "extended CMR" in the sense that the values currently defined as reserved for future use ("for future use", "reserved") and optionally unused values ("not used") are now used as defined above to indicate an adaptation request, providing that a signaling parameter activates this feature.

The adaptation request, which takes the form of new CMR codes, is therefore inserted into RTP packets defined by an RTP header (see FIG. 8). This header comprises the following fields:

V for version, which identifies the RTP version
P for padding—if it is set to 1, the packet contains padding octets at the end of the packet in addition to the payload
X for extension—if it is set to 1, the existing header is followed by an extension
CC, for "CSRC count", indicates the number of CSRC identifiers
M, for "marker", indicates whether the current data are particularly relevant to the application
PT, for "payload type", indicates the format of the payload
"Sequence number" is incremented by 1 for each RTP packet sent and allows the receiver to detect losses and to repair the sequences of packets
"Timestamp" to specify the send time of each packet and to allow the receiver to read the received samples at suitable intervals
SSRC, for "Synchronization source", which identifies each source of the same stream differently
CSRC, for "Contributing sources", which indicates the sources that contribute to the payload of the packet.

It will be noted that it is possible to add one or more signaling parameters to, for example, parameterize the offset in the case of 100% redundancy.

This embodiment of the invention has the advantage of not increasing the size of the IP packets and of not modifying the RTP header of the packets.

Thus, it is always possible to perform an RTP header compression in certain cases of use, without this having an impact on the adaptation requests. This solution however has the drawback of generating only a limited signaling space and is applicable only to coders that define the CMR concept and for which a number of free codes is sufficient.

Figure 9:
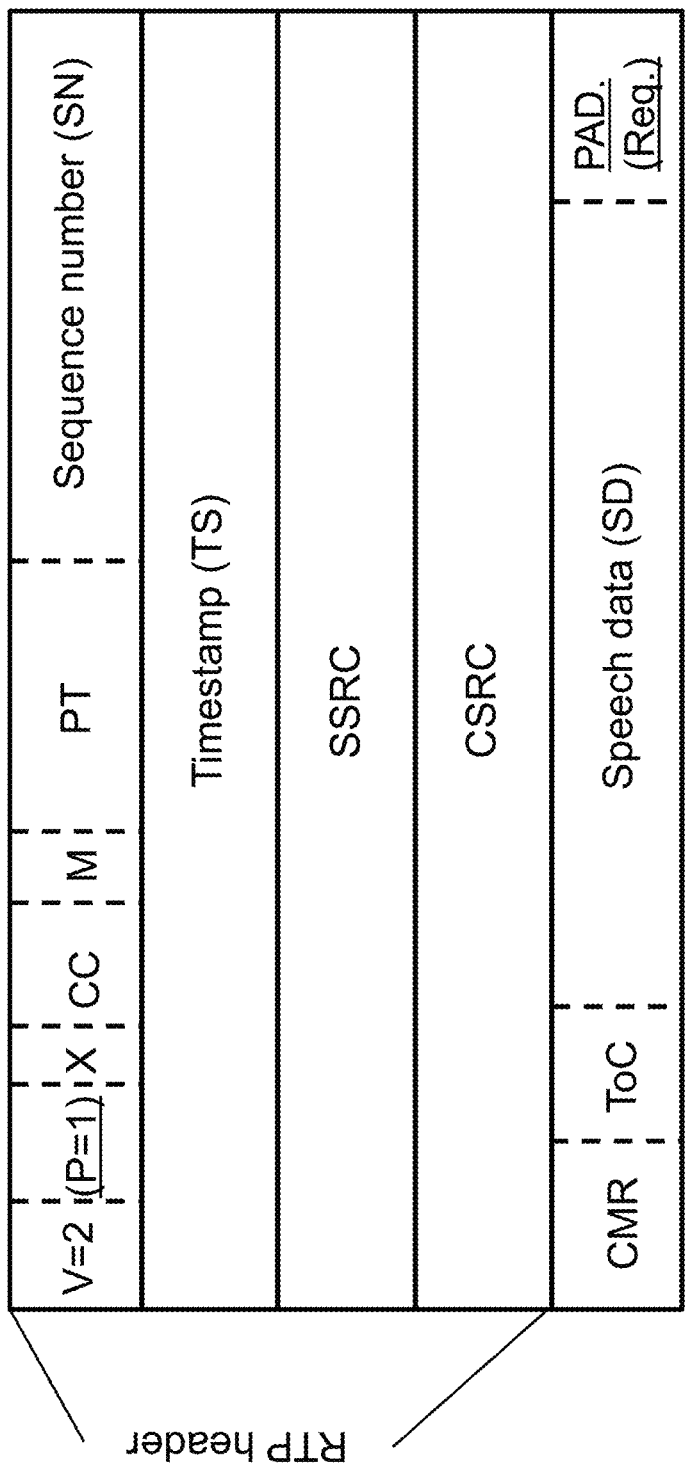
FIG. 9 illustrates a payload format used, according to a second embodiment of the invention, to transport an adaptation request.

In a second embodiment, which is illustrated in FIG. 9, the adaptation request determined by the receiver of a terminal is coded into a field of the padding request at the end of the signaling of the protocol to be transported to the sender of the remote terminal.

In this embodiment, the negotiation signaling between the codecs of the terminals that takes place on initialization of the communication session defines, as seen above, an adaptation parameter "adapt_red" or "adapt_ext" allowing this padding field to be used and that is comprehensible both to the receiver and to the sender of the remote terminals.

When this parameter is defined, a padding field is defined to specify the desired type of adaptation.

A one-octet padding field (PAD.Req) is used, a one-octet extended CMR code such as defined above being inserted therein.

Padding is typically inserted at the end of the payload, and to avoid decreasing the effectiveness of the header compression, the bit "P" of the RTP header will not be set to 1. In contrast, padding will be inserted with the request followed by an additional octet indicating the number of padding octets according to RFC 3550. This approach allows potential impacts on existing terminals to be avoided.

In variants, the padding bits (before the last added octet indicating the number of padding octets) will use the same syntax as in the request-coding format of RTCP APP according to TS 26.114 (section 10), with in particular a prefix on 4 "ID" bits.

In variants, for the EVS codec, the padding normally set by default to zero in header-full mode during "packet encapsulation" will be replaced by the padding according to the invention. This has the advantage of minimizing the number of additional octets.

For the AMR and AMR-WB codecs, the existing prior-art 4-bit CMR illustrated in FIG. 3c will still be used but the new "CMR codes" such as defined in the first embodiment will be inserted on 4 bits in the LSB, at the end of the bit stream as illustrated in FIG. 9; the 4 other bits in the MSB will be set to zero. In variants, the LSB and MSB will be inverted.

The RTP header shown in FIG. 9 contains the following fields:

V for version, which identifies the RTP version
P for padding—if it is set to 1, the packet contains padding octets at the end of the packet in addition to the payload. According to the invention, it is preferable not to set the padding bit to 1 in order not to decrease the effectiveness of the header compression. In variants, this bit will be set to 1 as in the variant embodiment corresponding to FIG. 10.

X for extension—if it is set to 1, the existing header is followed by an extension CC, for "CSRC count", indicates the number of CSRC identifiers M, for "marker", indicates whether the current data are particularly relevant to the application PT, for "payload type", indicates the format of the payload "Sequence number" is incremented by 1 for each RTP packet sent and allows the receiver to detect losses and to repair the sequences of packets "Timestamp" to specify the send time of each packet and to allow the receiver to read the received samples at suitable intervals SSRC, for "Synchronization source", which identifies each source of the same stream differently CSRC, for "Contributing sources", which indicates the sources that contribute to the payload of the packet.

The payload data therefore comprise the conventional CMR field, the ToC field such as defined above, the speech data and the adaptation request such as defined.

For the EVS codec, the padding field is used in the same way at the end of the bit stream to insert the CMR code such as defined in the first embodiment.

However, in this case, the CMR for the AMR and AMR-WB codecs will have to be set to "NO_REQ" and the signaling parameter will allow it to be understood that the padding field with the one-octet "extended CMR" is to be taken into consideration.

This embodiment has the advantage of being able to specify both a conventional change of mode, via an in existing CMR code, and a different adaptation request, via use of a new code in a different location in the payload format.

This solution also has the advantage of not modifying the RTP header of the packets.

Thus, it is still possible to perform an RTP header compression in certain cases of use, without this having an impact on the adaptation requests.

The operation of the various blocks of FIGS. 6 and 7 is unchanged, with the exception that the extended request is transported in a padding field.

Figure 10:
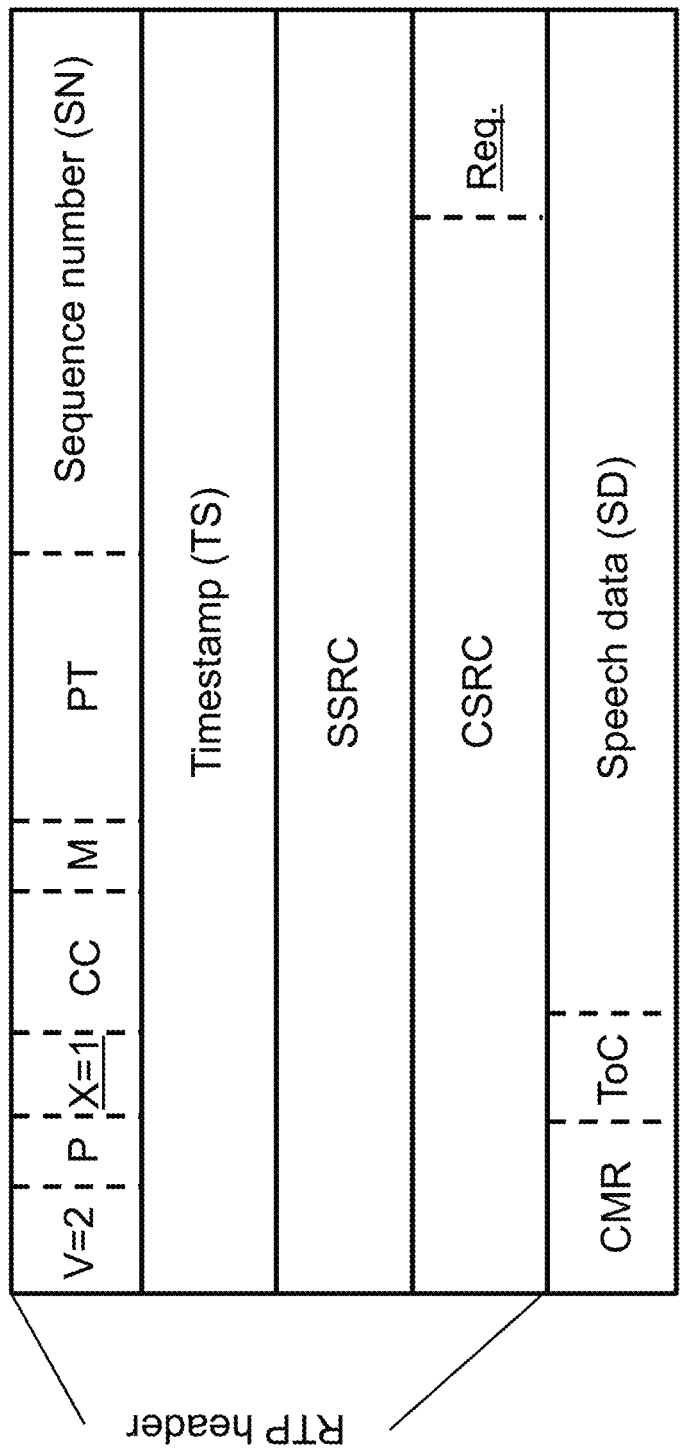
FIG. 10 illustrates a payload format used, according to another embodiment of the invention, to transport an adaptation request.

In one possible embodiment, the adaptation request such as defined by the new CMR codes will possibly be inserted in the header of the RTP payload format as illustrated in FIG. 10. However, this method has the drawback, on the one hand, of increasing the size of the RTP packets and, on the other hand, of decreasing the effectiveness of existing header-compression methods because the extension bit (X) of the RTP header must be set to 1.

The operation of the various blocks of FIGS. 6 and 7 is unchanged, with the exception that the extended request is transported in a padding field. The header extension is here assumed to be signaled according to RFC 5285 with the "extmap" field. In variants, other extension methods will be used.

Figure 11:
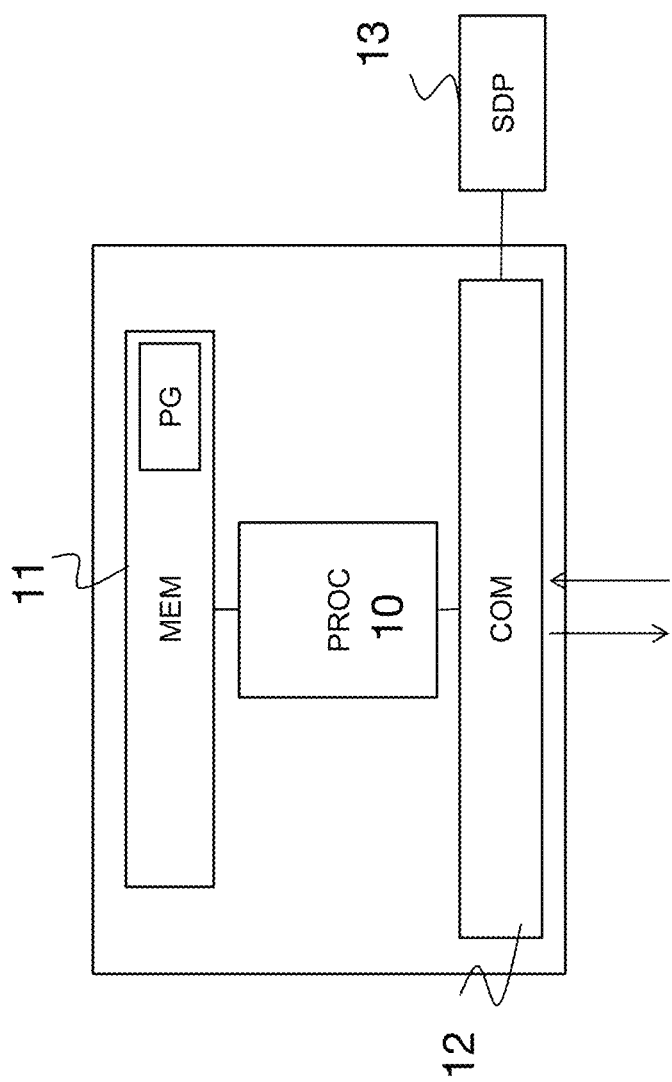
FIG. 11 illustrates a hardware embodiment of a terminal comprising a receiving device that implements the signaling method according to one embodiment.

FIG. 11 now illustrates an example of a hardware embodiment of a communication terminal comprising a receiving device able to implement the signaling method according to the invention, in particular using at least one signaling or configuration parameter of SDP type.

The terminal TA comprises a storage space 11, for example a memory MEM, a processing unit 10 comprising a processor P, which is controlled by a computer program PG, which is stored in the memory 11 and which implements the signaling method according to the invention.

On initialization, the code instructions of the program PG are for example loaded into a RAM (not shown) before being executed by the processor P of the processing unit 10. The program instructions may be stored on a storage medium such as a flash memory, a hard disk or any other non-volatile storage medium.

The processor implements the signaling method such as described with reference to FIG. 6, according to the instructions of the program PG.

The terminal TA comprises a communication module 12 able to receive and transmit real-time data from and to a communication network and able to read signaling or configuration data of SDP type 13 either via the signaling sent in the network or from the memory 11 of the terminal. L The terminal comprises a receiving device including a module for verifying the existence of a signaling parameter obtained in the phase of negotiation of the codecs used that took place during the initialization of the communication session, an adapting module able to determine an adaptation request relating to a frame aggregation and/or redundancy request, and a module for inserting the request into a payload format via a real-time protocol of RTP type. These modules are such as described with reference to FIG. 6 or to FIG. 7.

The term module can correspond either to a software component or to a hardware component or a set of hardware and software components, a software component itself corresponding to one or more computer programs or subprograms or more generally to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The terminal is for example a telephone, a smart phone, a tablet, a computer, a residential gateway or a connected thing.

APPENDIX 1

| Conventional SDP offer |
|---|
| m=audio 49152 RTP/AVP 97 98 99 100 101 |
| b=AS:42 |
| b=RS:0 |
| b=RR:2000 |
| a=rtpmap:97 EVS/16000/1 |
| a=fmtp:97 br=9.6-24.4; bw=swb; max-red=220 |
| a=rtpmap:98 AMR-WB/16000/1 |
| a=fmtp:98 mode-change-capability=2; max-red=220 |
| a=rtpmap:99 AMR-WB/16000/1 |
| a=fmtp:99 mode-change-capability=2; max-red=220; octet-align=1 |
| a=rtpmap:100 AMR/8000/1 |
| a=fmtp:100 mode-change-capability=2; max-red=220 |
| a=rtpmap:101 AMR/8000/1 |
| a=fmtp:101 mode-change-capability=2; max-red=220; octet-align=1 |
| a=ptime:20 |
| a=maxptime:240 |

APPENDIX 2

| SDP offer with an adaptation parameter |
|---|
| m=audio 49152 RTP/AVP 97 98 99 100 101 |
| a=adapt_red: red-offset=2 |
| b=AS:42 |
| b=RS:0 |
| b=RR:2000 |
| a=rtpmap:97 EVS/16000/1 |
| a=fmtp:97 br=9.6-24.4; bw=swb; max-red=220 |
| a=rtpmap:98 AMR-WB/16000/1 |

APPENDIX 2-continued

SDP offer with an adaptation parameter a=fmtp:98 mode-change-capability=2; max-red=220
a=rtpmap:99 AMR-WB/16000/1
a=fmtp:99 mode-change-capability=2; max-red=220; octet-align=1
a=rtpmap:100 AMR/8000/1
a=fmtp:100 mode-change-capability=2; max-red=220
a=rtpmap:101 AMR/8000/1
a=fmtp:101 mode-change-capability=2; max-red=220; octet-align=1
a=ptime:20
a=maxptime:240

APPENDIX 3

SDP offer with an adaptation parameter m=audio 49152 RTP/AVP 97 98 99 100 101
a=adapt_ext: red-offset = 1,2; agg=1
b=AS:42
b=RS:0
b=RR:2000
a=rtpmap:97 EVS/16000/1
a=fmtp:97 br=9.6-24.4; bw=swb; max-red=220
a=rtpmap:98 AMR-WB/16000/1
a=fmtp:98 mode-change-capability=2; max-red=220
a=rtpmap:99 AMR-WB/16000/1
a=fmtp:99 mode-change-capability=2; max-red=220; octet-align=1
a=rtpmap:100 AMR/8000/1
a=fmtp:100 mode-change-capability=2; max-red=220
a=rtpmap:101 AMR/8000/1
a=fmtp:101 mode-change-capability=2; max-red=220; octet-align=1
a=ptime:20
a=maxptime:240

Although the present disclosure has been described with reference to one or more examples, workers skilled in the art will recognize that changes may be made in form and detail without departing from the scope of the disclosure and/or the appended claims.

The invention claimed is:

1. A method for signaling an adaptation request that requests adaptation of at least one of a coding or decoding of real-time signals on a real-time communication session between a first terminal and a second terminal, wherein the method comprises the following acts performed by the first terminal:
   verifying existence of a signaling parameter obtained in a phase of negotiation of codecs used during initialization of the communication session with the second terminal, the signaling parameter indicating a capacity to use an existing reserved or unused code of a Codec Mode Request (CMR) type to code a frame aggregation and/or redundancy request;
   determining the adaptation request, which relates to a frame aggregation and/or redundancy request; and
   in response to obtaining the signaling parameter, inserting the adaptation request into a payload format, using a field included in an existing reserved or unused mode-change request code of the Codec Mode Request (CMR) type to transport the adaptation request, via a real-time protocol of a Real Time Protocol (RTP) type and transporting the adaptation request toward the second terminal via the real-time protocol.

2. The method as claimed in claim 1, wherein, in the case where the first and second terminals use coders/decoders of Adaptive Multi-Rate (AMR) or AMR-Wide Band (WB) type, the first terminal uses at least one default unused CMR code value from 9 to 14 to code aggregation and redundancy requests that request aggregation and redundancies of various rates.

3. The method as claimed in claim 1, wherein, in the case where the first and second terminal use coders/decoders of Enhanced Voice Services (EVS) type, at least one default unused CMR code value is used to code the redundancy requests that request redundancies of various rates.

4. The method as claimed in claim 1, comprising using a field of a padding request at an end of signaling of the RTP protocol to transport the adaptation request that requests adaptation of the communication session.

5. A first terminal that transmits to a second terminal a signaling of an adaptation request that requests adaptation of the coding/decoding of real-time signals on a real-time communication session between the first terminal and the second terminal, wherein the first terminal comprises:
   at least one processor; and
   at least one non-transitory computer-readable medium comprising instructions stored thereon, which when executed by the at least one processor configure the first terminal to:
   verify existence of a signaling parameter obtained in a phase of negotiation of codecs used that took place during initialization of the communication session, the signaling parameter indicating a capacity to use an existing reserved or unused code of a Codec Mode Request (CMR) type to code a frame aggregation and/or redundancy request;
   determine the adaptation request, which relates to a frame aggregation and/or redundancy request; and
   insert the adaptation request into a payload format, using a field included in an existing reserved or unused mode-change request code of the Codec Mode Request (CMR) type to transport the adaptation request, via a real-time protocol of a Real Time Protocol (RTP) type.

6. A non-transitory processor-readable storage medium storing a computer program containing instructions for execution of a method for signaling an adaptation request, when the instructions are executed by at least one processor of a first terminal, wherein the instructions configure the first terminal to:
   verifying existence of a signaling parameter obtained in a phase of negotiation of codecs used during initialization of a real-time communication session with a second terminal, the signaling parameter indicating a capacity to use an existing reserved or unused code of a Codec Mode Request (CMR) type to code a frame aggregation and/or redundancy request;
   determining the adaptation request, which requests adaptation of at least one of a coding or decoding of real-time signals of the communication session and which relates to a frame aggregation and/or redundancy request; and
   inserting the adaptation request into a payload format, using a field included in an existing reserved or unused mode-change request code of the Codec Mode Request (CMR) type to transport the adaptation request, via a real-time protocol of a Real Time Protocol (RTP) type and transporting the adaptation request toward the second terminal via the real-time protocol.

* * * * *